(12) United States Patent
Saito et al.

(10) Patent No.: US 9,325,754 B2
(45) Date of Patent: Apr. 26, 2016

(54) INFORMATION PROCESSING DEVICE AND INFORMATION PROCESSING METHOD

(71) Applicant: SONY CORPORATION, Tokyo (JP)

(72) Inventors: Kazuyuki Saito, Kanagawa (JP); Hiroki Kato, Kanagawa (JP); Takayuki Sakamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 249 days.

(21) Appl. No.: 13/958,024

(22) Filed: Aug. 2, 2013

(65) Prior Publication Data

US 2014/0089238 A1 Mar. 27, 2014

(30) Foreign Application Priority Data

Sep. 26, 2012 (JP) ................ 2012-211766

(51) Int. Cl.
*G06F 15/18* (2006.01)
*H04L 29/06* (2006.01)
*G06N 99/00* (2010.01)
*G06F 3/01* (2006.01)
*G06N 5/02* (2006.01)
*G06N 7/00* (2006.01)

(52) U.S. Cl.
CPC ............. *H04L 65/403* (2013.01); *G06F 3/01* (2013.01); *G06N 99/005* (2013.01); *G06N 5/025* (2013.01); *G06N 7/005* (2013.01)

(58) Field of Classification Search
None
See application file for complete search history.

(56) References Cited

U.S. PATENT DOCUMENTS

| 6,344,845 | B1* | 2/2002 | Matsuyama | 345/157 |
| 2006/0181517 | A1* | 8/2006 | Zadesky et al. | 345/173 |
| 2009/0144226 | A1* | 6/2009 | Tateno | 707/1 |
| 2010/0192064 | A1* | 7/2010 | Beppu et al. | 715/710 |
| 2011/0040790 | A1* | 2/2011 | Tateno | 707/780 |
| 2013/0246972 | A1* | 9/2013 | Tateno | 715/825 |

FOREIGN PATENT DOCUMENTS

JP 2012-103832 5/2012

* cited by examiner

*Primary Examiner* — Kakali Chaki
*Assistant Examiner* — Ababacar Seck
(74) *Attorney, Agent, or Firm* — Paratus Law Group, PLLC

(57) ABSTRACT

Disclosed if an information processing device including a display control unit that controls a display of an input screen capable of inputting evaluations of an item based on a plurality of viewpoints, in accordance with a plurality of axes representing different viewpoints; an evaluation acquisition unit that acquires the evaluations of the item which are input by a user by the use of the input screen; and a transmission control unit that controls transmission of the evaluations of the item to another information processing device.

19 Claims, 21 Drawing Sheets

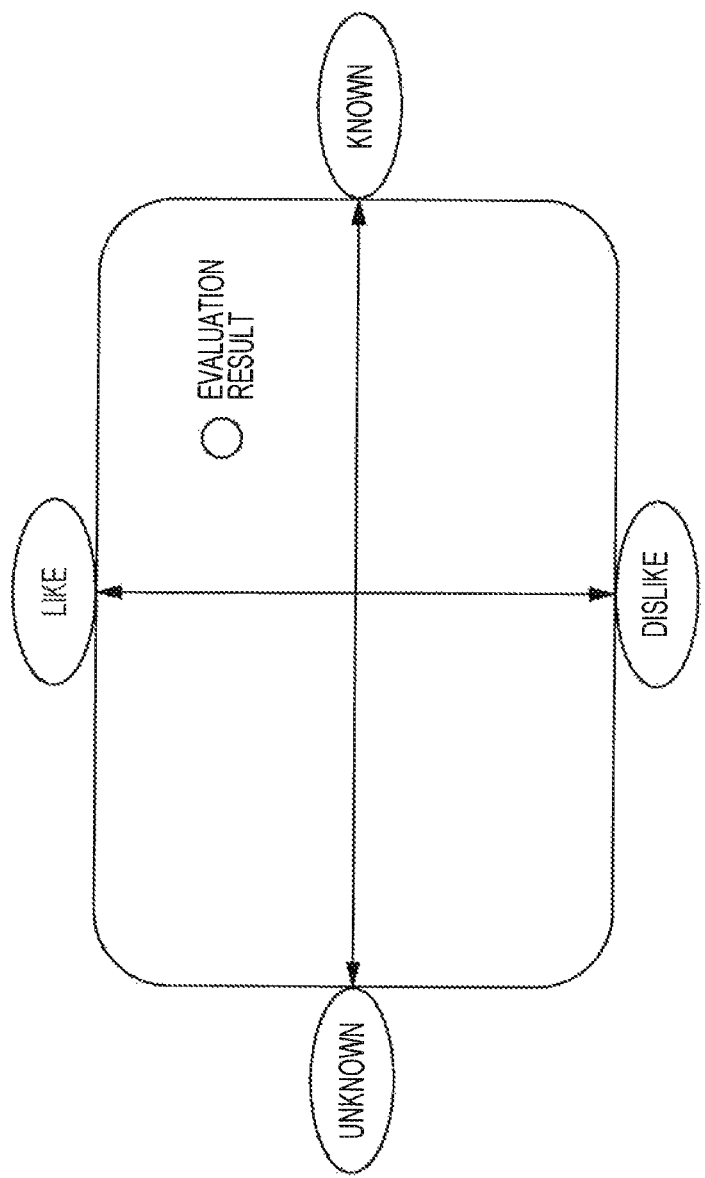

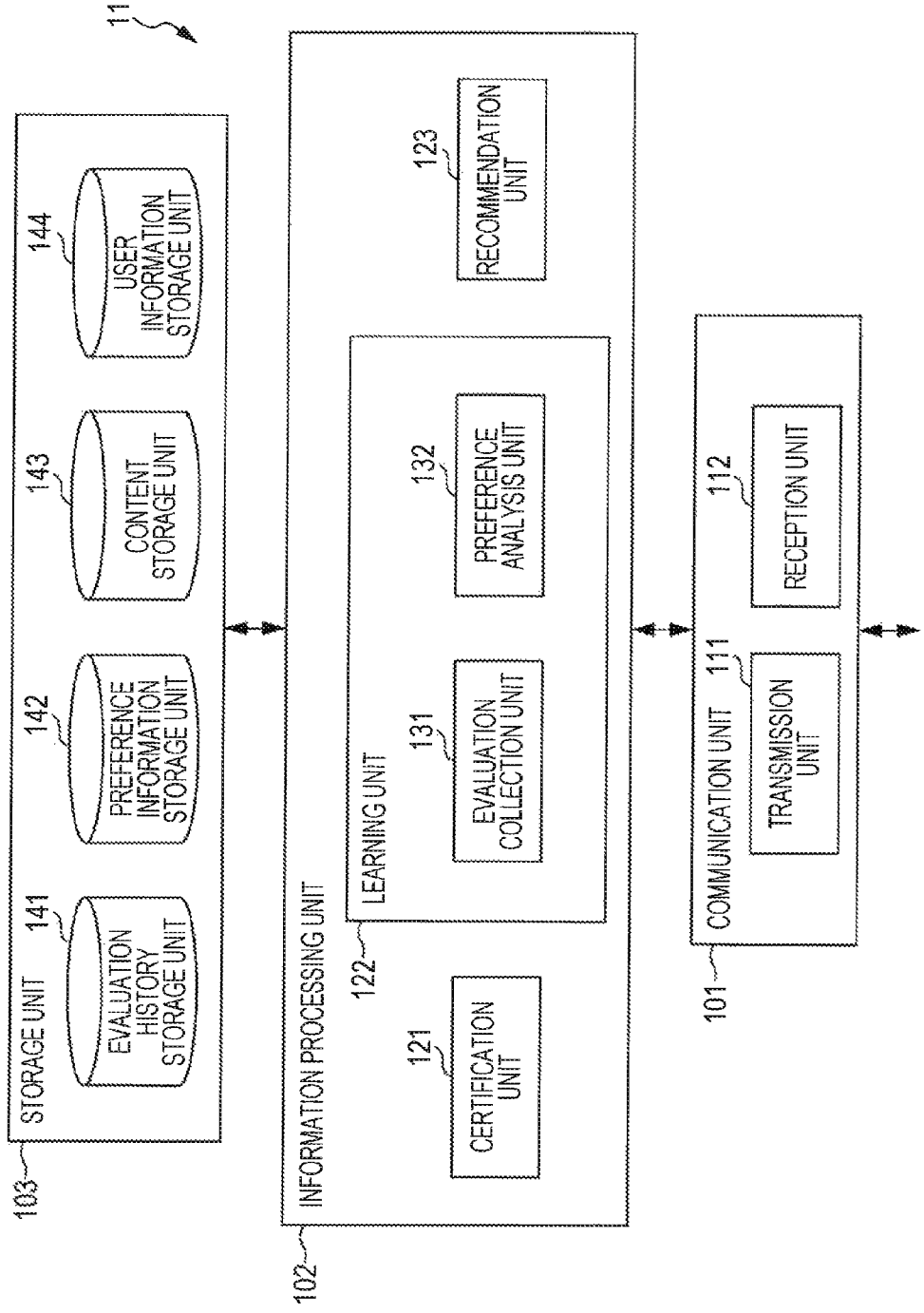

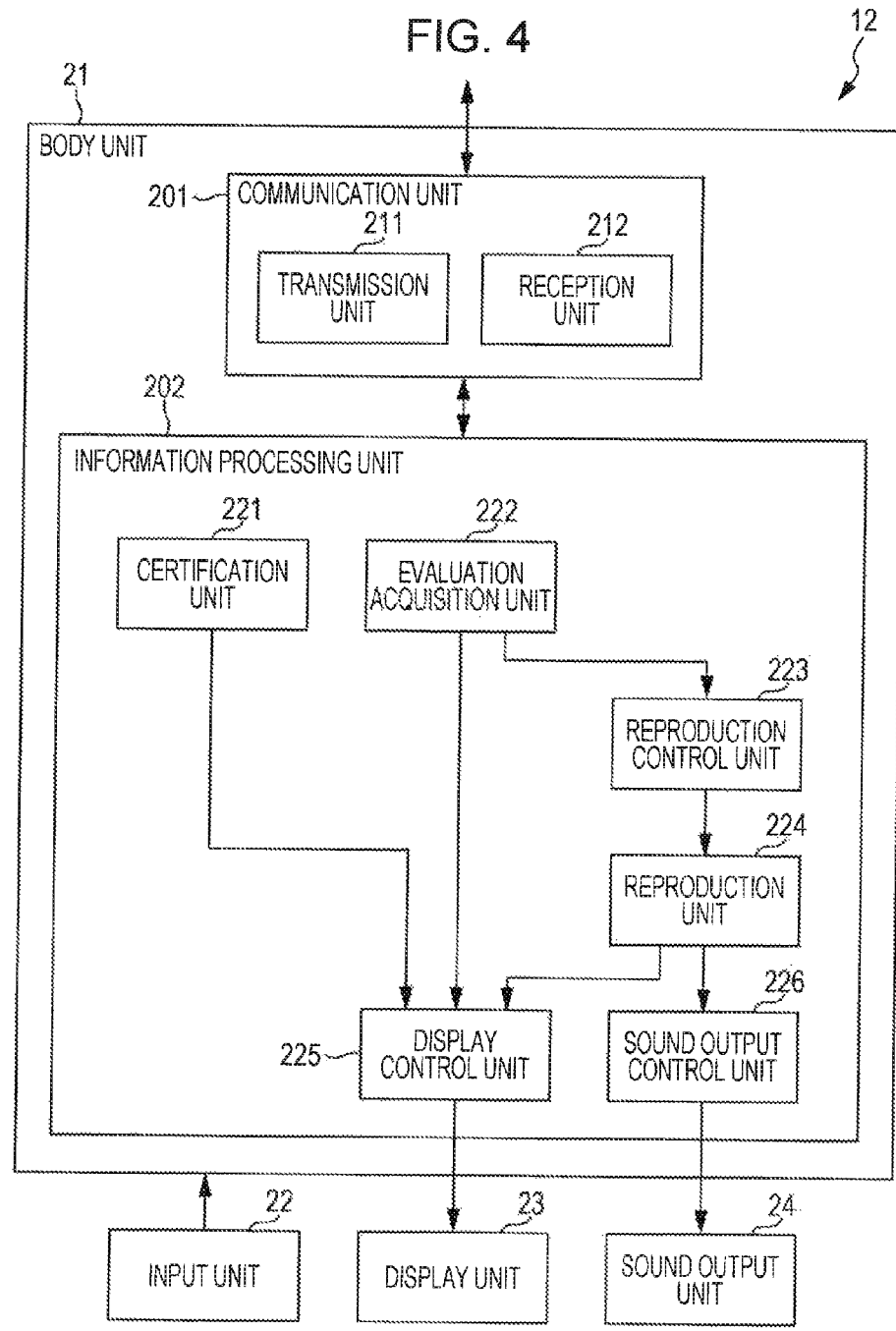

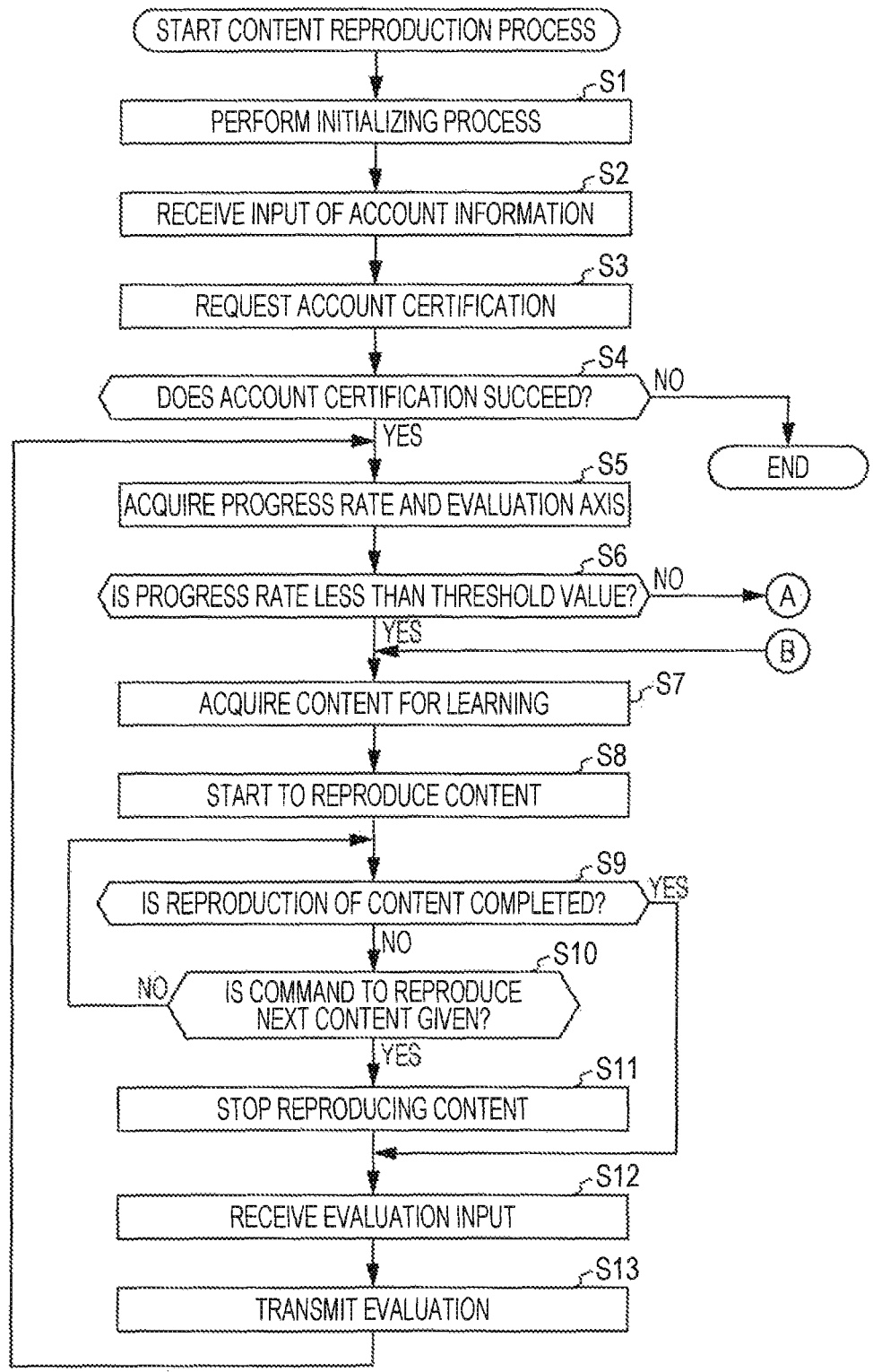

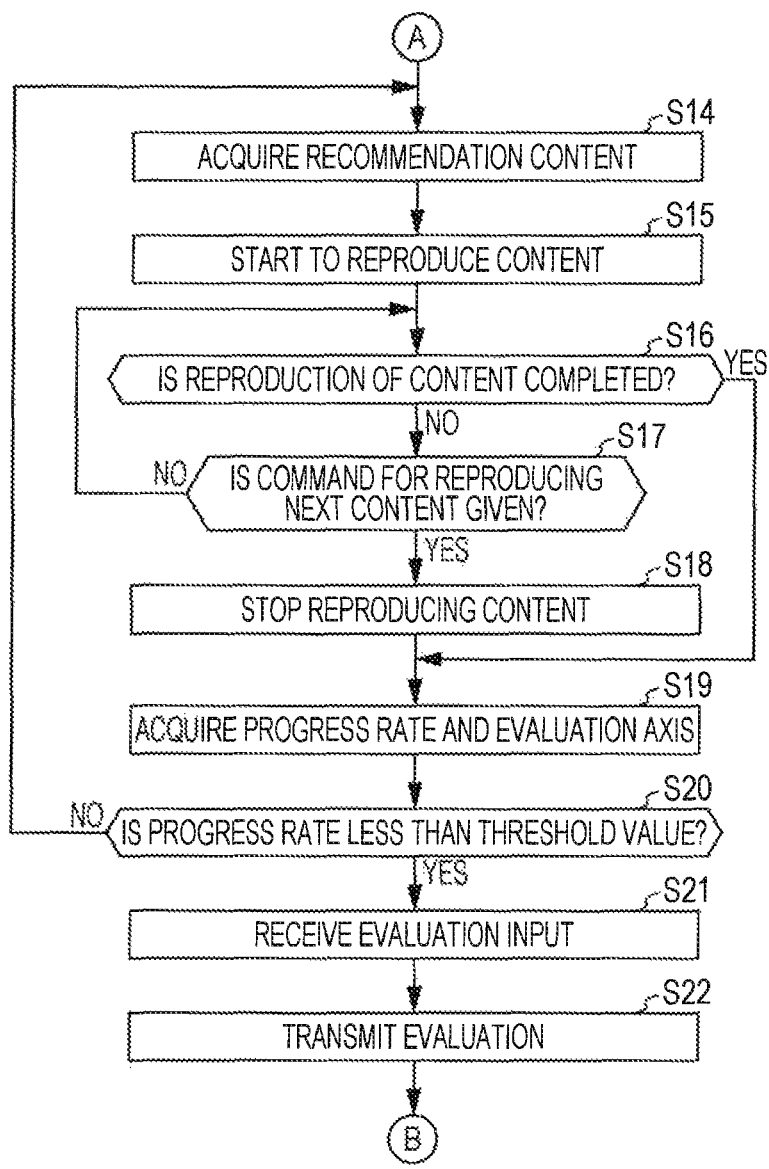

FIG. 7

CLIENT REQUEST

1  GET https://server_name/inquire?progress=1&pivot=1
2  Session-ID: 123456789ZXYABCD
3  Accept-Language: ja

SERVER RESPONSE

1   <Response>
2    <Progress>
3     <Value>0.0</Value>
4     <Threshold>0.5</Threshold>
5     <Recommend>1.0</Recommend>
6    </Progress>
7    <Pivot id="TUIOP0123456789A" Language="ja">
8     <Axis id="x" max="1.0" min="-1.0">
9      <Factor value="1.0">KNOWN</Factor>
10     <Factor value="-1.0">UNKNOWN</Factor>
11    </Axis>
12    <Axis id="y" max="1.0" min="-1.0">
13     <Factor value="1.0">LIKE</Factor>
14     <Factor value="-1.0">DISLIKE</Factor>
15    </Axis>
16   </Pivot>
17  </Response>

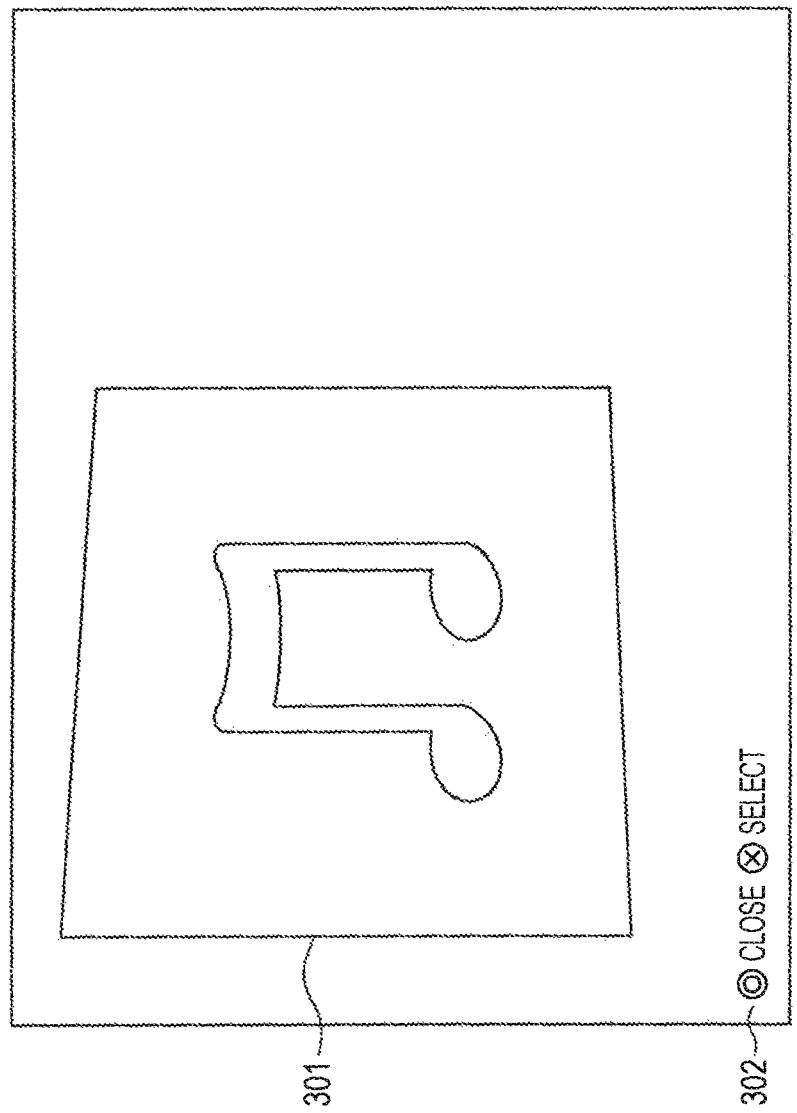

FIG. 18

| SESSION ID | ACCOUNT ID | SESSION EXPIRE DATE |
|---|---|---|
| 123456789ZXYABCD | Alpha | Web, 15 Feb 2012 14:46:06 +0900 |
| JKLM123456789ZXY | Bravo | Mon, 13 Feb 2012 18:16:26 +0900 |

FIG. 19

| ACCOUNT ID | PIVOT ID | CONTENT ID | EVALUATION | DATE |
|---|---|---|---|---|
| Alpha | TUIOP89012345678 | TRACKLMN01234567 | (-0.2, -0.1) | 15 Feb 2012 14:47:15 |
| | TUIOP0123456789A | TRACKLMN01234567 | (0.4, 0.6) | 15 Feb 2012 14:46:06 |
| | TUIOP0123456789A | TRACKLMN45678901 | (-1.0, 1.0) | 15 Feb 2012 13:28:12 |
| Bravo | TUIOP0123456789A | TRACKLMN01234567 | (0.0, 0.8) | 13 Feb 2012 18:16:26 |

FIG. 20

| CONDITION | PIVOT ID |
|---|---|
| NUMBER OF EVALUATIONS ≤ 50 | TUIOP0123456789A |
| NUMBER OF EVALUATIONS > 50 | TUIOP89012345678 |

FIG. 21

| PIVOT ID | LANGUAGE | CONFIGURATION |
|---|---|---|
| TUIOP0123456789A | ja | <Axis id="x" max="1.0" min="-1.0"><br><Factor value="1.0">KNOWN</Factor><br><Factor value="-1.0">UNKNOWN</Factor></Axis><br><Axis id="y" max="1.0" min="-1.0"><br><Factor value="1.0">LIKE</Factor><br><Factor value="-1.0">DISLIKE</Factor></Axis><br><compare>two_pair</compare> |
| TUIOP8901234567B | ja | <Axis id="x" max="1.0" min="-1.0"><br><Factor value="1.0">HAPPY</Factor><br><Factor value="-1.0">SAD</Factor></Axis><br><Axis id="y" max="1.0" min="-1.0"><br><Factor value="1.0">COMFORTABLE</Factor><br><Factor value="-1.0">UNCOMFORTABLE</Factor></Axis><br><compare>false</compare> |
| TUIOP0123456789A | en | <Axis id="x" max="1.0" min="-1.0"><br><Factor value="1.0">Wellknown</Factor><br><Factor value="-1.0">Unknown</Factor></Axis><br><Axis id="y" max="1.0" min="-1.0"><br><Factor value="1.0">Like</Factor><br><Factor value="-1.0">Dislike</Factor></Axis><br><compare>two_pair</compare> |

INFORMATION PROCESSING DEVICE AND INFORMATION PROCESSING METHOD

BACKGROUND

The present disclosure relates to an information processing device and an information processing method, and more particularly, to an information processing device and an information processing method which are suitable for a case of recommending various items to a user.

Hitherto, systems that recommend various items including contents such as an image or music have been suggested to recommend an item according to the preference of each user by causing the user to evaluate whether he or she likes or dislikes the recommended item and by ascertaining the preference of each user (for example, see Japanese Unexamined Patent Application Publication No. 2012-103832).

In such a recommendation system, it is desirable to acquire an evaluation based on a viewpoint (for example, whether the item is known or unknown) other than like or dislike, from a user, in order to recommend an item, which is consistent with a user's preference, more rapidly and properly.

SUMMARY

However, a work for inputting an evaluation of an item is bothersome to a user. Therefore, when the number of viewpoints to be evaluated increases, the burden on the user increases accordingly, and thus there is a concern that the amount of evaluations that are capable of being acquired from each user may decrease. In addition, when the burden on the user increases, it is more likely that the user stops the use of a service.

Consequently, the present disclosure is used to easily input an evaluation of an item.

An information processing device according to an embodiment of the present disclosure includes a display control unit that controls a display of an input screen capable of inputting evaluations of an item based on a plurality of viewpoints, in accordance with a plurality of axes representing different viewpoints, an evaluation acquisition unit that acquires the evaluations of the item which are input by a user by the use of the input screen, and a transmission control unit that controls transmission of the evaluations of the item to another information processing device.

The input screen may include an input region or an input space which is defined by two or more axes and is capable of inputting evaluations based on two or more viewpoints at a time.

The input region or the input space may be capable of inputting an evaluation value according to a set of coordinates within the input region or the input space.

The display control unit may control a display switching between a plurality of the input regions or the input spaces through a combination of the different axes.

The display control unit may control at least one of the evaluations that are input by the user with respect to an item that is different from an item, to be evaluated to be displayed on the input region or the input space.

One of the plurality of viewpoints may relate to like or dislike of an item.

The display control unit may control the input screen to be automatically displayed when the number of evaluations of the item of the user is less than a predetermined threshold value, and may control the input screen to be displayed by a user's operation when the number of evaluations of the item of the user is equal to or greater than the threshold value.

The transmission control unit may control transmission of a command to reset an evaluation history of the user, to the another information processing device by a user's operation.

An information processing method according to an embodiment of the present disclosure includes causing an information processing device to control a display of an input screen capable of inputting evaluations of an item based on a plurality of viewpoints, in accordance with a plurality of axes representing different viewpoints, causing the information processing device to acquire the evaluations of the item which are input by a user by the use of the input screen, and causing the information processing device to control transmission of the evaluations of the item to another information processing device.

An information processing device according to another embodiment of the present disclosure includes a display control unit that controls a display of an input screen capable of inputting evaluations of an item based on a plurality of viewpoints, in accordance with a plurality of axes representing different viewpoints, in another information processing device, and a reception control unit that controls reception of the evaluations of the item which are input by a user by the use of the input screen, from the another information processing device.

The input screen may include an input region or an input space which is defined by two or more axes and is capable of inputting evaluations based on two or more viewpoints at a time.

The display control unit may control a display switching between a plurality of the input regions or the input spaces through a combination of the different axes.

The display control unit may control at least one of the evaluations that are input by the user with respect to an item that is different from an item, to be evaluated to be displayed on the input region or the input space.

One of the plurality of viewpoints may relate to like or dislike of an item.

The display control unit may control the input screen to be automatically displayed when the number of evaluations of the item of the user is less than a predetermined threshold value, and may control the input screen to be displayed by a user's operation when the number of evaluations of the item of the user is equal to or greater than the threshold value.

The information processing device may further include a learning unit that learns a preference of the user with respect to the item, on the basis of an evaluation history of the item of the user, and a recommendation unit that recommends an item to the user, on the basis of a learning result of the preference of the user.

The reception control unit may control reception of a command to reset the evaluation history from the another information processing device, and the learning unit may reset the evaluation history in response to the reset command.

The recommendation unit may recommend a learning item to the user when the number of evaluations of the item of the user is less than a predetermined threshold value, and may recommend an item to the user on the basis of a learning result of the preference of the user when the number of evaluations of the item of the user is equal to or greater than the threshold value.

The display control unit may control a display of a progress rate of the learning of the user's preference in the another information processing device.

An information processing method according to another embodiment of the present disclosure includes causing an information processing device to control a display of an input screen capable of inputting evaluations of an item based on a plurality of viewpoints, in accordance with a plurality of axes representing different viewpoints, in another information processing device, and causing the information processing device to control reception of the evaluations of the item which are input by a user by the use of the input screen, from the another information processing device.

In the embodiment of the present disclosure, an input screen capable of inputting evaluations of an item based on a plurality of viewpoints, in accordance with a plurality of axes representing different viewpoints is displayed, the evaluation of the item which is input by a user by the use of the input screen is acquired, and the evaluation of the item is transmitted to another information processing device.

In another embodiment of the present disclosure, an input screen capable of inputting evaluations of an item based on a plurality of viewpoints, in accordance with a plurality of axes representing different viewpoints is displayed on another information processing device, and the evaluation of the item which is input by a user by the use of the input screen is received from the another information processing device.

According to the embodiments of the present disclosure, it is possible to easily input an evaluation of an item. In particular, according to the embodiments of the present disclosure, it is possible to easily input evaluations of an item based on a plurality of viewpoints.

BRIEF DESCRIPTION OF THE DRAWINGS

FIG. 2 is a diagram illustrating an example of an evaluation input screen;

FIG. 3 is a block diagram illustrating a functional configuration example of a server;

FIG. 4 is a block diagram illustrating a functional configuration example of a client;

FIG. 5 is a flow chart illustrating a content reproduction process;

FIG. 6 is a flow chart illustrating the content reproduction process;

FIG. 7 is a diagram illustrating examples of a progress rate evaluation axis request command and a progress rate evaluation axis transmission command;

FIG. 8 is a diagram illustrating an example of a reproduction screen;

FIG. 18 is a diagram illustrating an example of a session table;

FIG. 19 is a diagram illustrating an example of an evaluation history table;

FIG. 20 is a diagram illustrating an example of an evaluation axis setting table;

FIG. 21 is a diagram illustrating an example of an axis information setting table;

DETAILED DESCRIPTION OF EMBODIMENTS

Hereinafter, a mode for carrying out the present disclosure (hereinafter, referred to as "embodiment") will be described. Meanwhile, the description thereof is performed in the following order.

1. Embodiment
2. Modified Example

1. Embodiment

Configuration Example of Information Processing System 1

Figure 1:
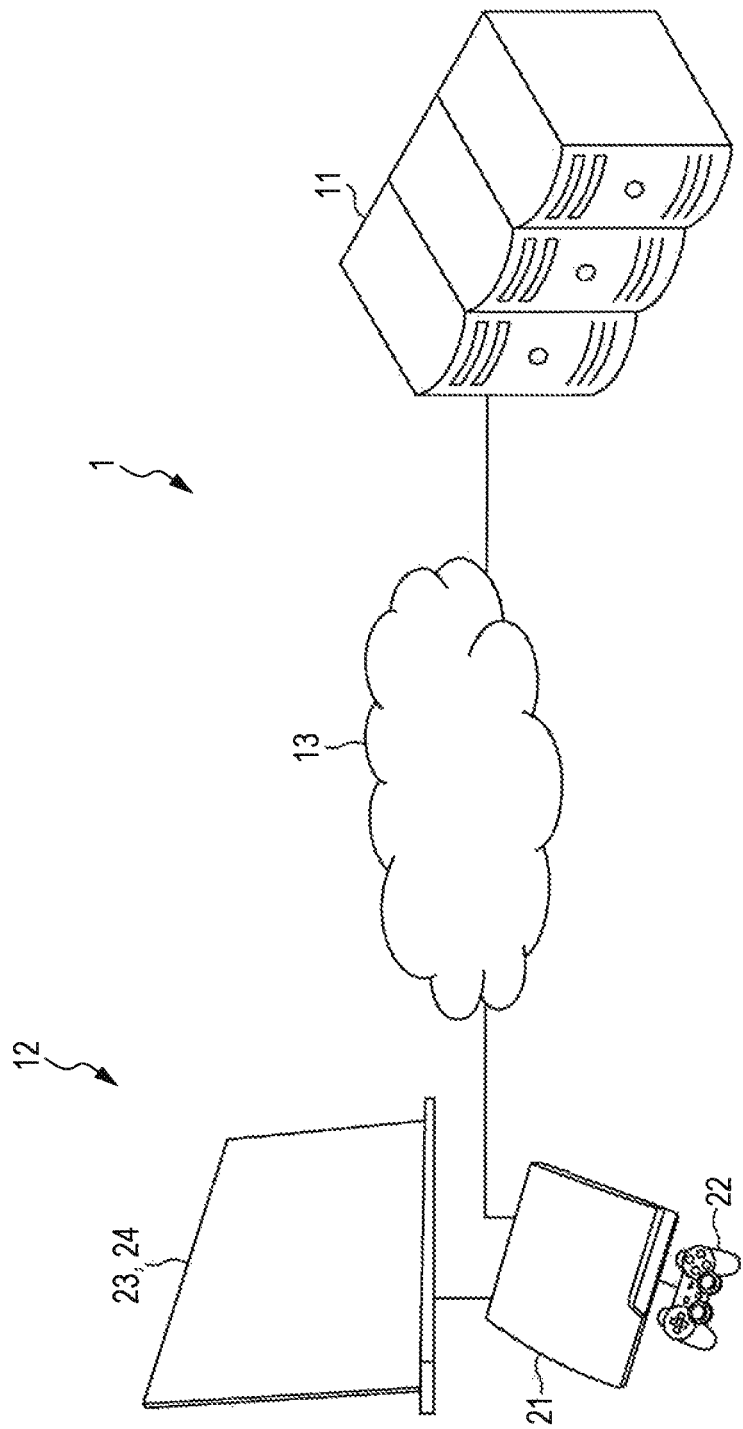
FIG. 1 is a diagram illustrating an information processing system according to an embodiment of the present disclosure.

FIG. 1 shows an information processing system according to an embodiment of the present disclosure.

The information processing system 1 includes a server 11 and a client 12. The server 11 and the client 12 are connected to each other through a network 13 that is constituted by the Internet or the like.

The server 11 provides a service (hereinafter, referred to as a content distribution service) which distributes and recommends a content which is one of various items, to the client 12.

Meanwhile, an example of a case where the server 11 distributes and recommends music in various contents will be described below.

The client 12 is constituted by a device capable of using the content distribution service that is provided by the server 11, for example, a personal computer, a game machine, a portable information terminal, a mobile phone, a smart phone, a video player, or an audio player. Meanwhile, herein, an example is shown where the client 12 is constituted by a body unit 21, an input unit 22, a display unit 23, and a sound output unit 24. In addition, herein, an example is shown where the display unit 23 and the sound output unit 24 are integrally formed with each other.

The body unit 21 receives a content that is transmitted from the server 11, through the network 13, and reproduces the content. The body unit 21 supplies image data that is acquired as a result of the reproduction of the content, to the display unit 23, and causes an image based on the image data to be displayed. In addition, the body unit 21 supplies sound data that is acquired as a result of the reproduction of the content, to the sound output unit 24, and causes a sound based on the sound data to be output.

In addition, the body unit 21 causes an operation screen for operating the client 12 to be displayed on the display unit 23. The operation screen displayed on the display unit 23 includes an evaluation input screen for inputting an evaluation of a content.

FIG. 2 shows an example of the evaluation input screen. In the evaluation input screen, it is possible to input evaluations of a content based on two viewpoints (in other words, evaluation criterions) at a time, in accordance with an x-axis representing a viewpoint regarding whether the content is known or unknown and a y-axis representing a viewpoint regarding whether to like or dislike the content. That is, an arbitrary set of coordinates within an input region that is defined by the x-axis and the y-axis is designated, and thus an evaluation value according to the designated set of coordinates can be given to the content, with respect to each viewpoint.

Meanwhile, like the x-axis and the y-axis of FIG. 2, an axis that represents a viewpoint for evaluating a content and is used to input the evaluation of the content will be referred to as an evaluation axis below.

The body unit 21 transmits an evaluation of a content which is input using the input unit 22 in accordance with the evaluation input screen, to the server 11 through the network 13.

The input unit 22 is constituted by various input devices, for example, a keyboard, a mouse, a touch panel, a button, a switch, or a microphone. The input unit 22 supplies information, a command, or the like, which is input by a user, to the body unit 21.

The display unit 23 is constituted by various display devices, for example, a display.

The sound output unit 24 is constituted by various sound output devices, for example, a speaker or a sound output terminal.

Meanwhile, in FIG. 1, in order to facilitate understanding of the drawing, only one client 12 is shown.

However, actually, a plurality of clients are connected to the network 13, and the content distribution service is provided to the plurality of clients from the server 11.

Configuration Example of Server 11

FIG. 3 shows a functional configuration example of the server 11. The server 11 includes a communication unit 101, an information processing unit 102, and a storage unit 103.

Meanwhile, components of the communication unit 101 and components of the information processing unit 102 can have access to each other. In addition, the components of the information processing unit 102 can have access to components of the storage unit 103.

The communication unit 101 communicates with the client 12 through the network 13. The communication unit 101 includes a transmission unit 111 and a reception unit 112.

The transmission unit 111 controls the transmission of a content and various pieces of information, commands, or the like regarding the content distribution service to the client 12 through the network 13.

The reception unit 112 controls the reception of various pieces of information, commands, or the like regarding the content distribution service from the client 12 through the network 13.

The information processing unit 102 performs various processes regarding the content distribution service. The information processing unit 102 includes a certification unit 121, a learning unit 122, and a recommendation unit 123.

The certification unit 121 certifies an account of a user who uses the content distribution service, on the basis of user information that is stored in a user information storage unit 144, in response to a request from the client 12. When the certification unit 121 succeeds in the account certification, the certification unit issues a Session ID for identifying a session through the certified account, and transmits the Session ID to the client 12 through the transmission unit 111. On the other hand, when the certification unit 121 fails in the account certification, the certification unit transmits information indicating a certification error to the client 12 through the transmission unit 111.

The learning unit 122 learns the preference of each user who uses the content distribution service by the use of the client 12. The learning unit 122 includes an evaluation collection unit 131 and a preference analysis unit 132.

The evaluation collection unit 131 transmits information indicating the evaluation axis that is used to input an evaluation of a content to the client 12 through the transmission unit 111, in response to a request from the client 12. In addition, the evaluation collection unit 131 receives an evaluation of a content of each user, which is transmitted from the client 12 through the network 13, through the reception unit 112. The evaluation collection unit 131 causes an evaluation history storage unit 141 to store the received evaluation of the content of each user. Further, the evaluation collection unit 131 resets a user's evaluation history that is stored in the evaluation history storage unit 141, in response to a request from the client 12.

In addition, the evaluation collection unit 131 calculates a progress rate of preference learning of each user, on the basis of the evaluation history of each user which is stored in the evaluation history storage unit 141. Then, the evaluation collection unit 131 transmits information indicating the progress rate to the client 12 through the transmission unit 111.

The preference analysis unit 132 analyzes the preference of each user with respect to the content, on the basis of the evaluation history of each user which is stored in the evaluation history storage unit 141. The preference analysis unit 132 causes the preference information storage unit 142 to store preference information indicating an analysis result of the preference of each user. In addition, the preference analysis unit 132 resets the user's preference information that is stored in the preference information storage unit 142, in response to a request from the client.

The recommendation unit 123 extracts a content that is used to learn the preference of each user or a content that is recommended to each user, from a content storage unit 143, on the basis of the preference information of each user which is stored in the preference information storage unit 142, in response to a request from the client 12. Then, the recommendation unit 123 transmits the extracted content to the client 12 through the transmission unit 111.

Meanwhile, hereinafter, a content used to learn a user's preference will be referred to as a learning content, and a content that is recommended to a user will be referred to as a recommended content.

The storage unit 103 includes the evaluation history storage unit 141, the preference information storage unit 142, the content storage unit 143, and the user information storage unit 144.

The evaluation history storage unit 141 stores an evaluation history of a content of each user.

The preference information storage unit 142 stores preference information indicating a result of the preference learning of each user.

The content storage unit 143 stores a content that is used in the content distribution service, and various pieces of information regarding the content.

The user information storage unit 144 stores account information of each user who uses the content distribution service.

Configuration Example of Body Unit 21 of Client 12

FIG. 4 shows a functional configuration example of the body unit 21 of the client 12. The body unit 21 of the client 12 includes a communication unit 201 and an information processing unit 202.

Meanwhile, components of the communication unit 201 and components of the information processing unit 202 can have access to each other.

The communication unit 201 communicates with the server 11 through the network 13. The communication unit 201 includes a transmission unit 211 and a reception unit 212.

The transmission unit 211 controls the transmission of various pieces of information, commands, or the like regarding the content distribution service to the server 11 through the network 13.

The reception unit 212 controls the reception of a content and various pieces of information, commands, or the like regarding a content distribution service from the server 11 through the network 13.

The information processing unit 202 includes a certification unit 221, an evaluation acquisition unit 222, a reproduction control unit 223, a reproduction unit 224, a display control unit 225, and a sound output control unit 226.

The certification unit 221 requests account certification from the server 11 through the transmission unit 211. The certification unit 221 receives a response to the account certification from the server 11 through the reception unit 212. Specifically, when the certification unit 221 succeeds in the account certification, the certification unit receives a Session ID from the server 11. In addition, when the certification unit 221 fails in the account certification, the certification unit receives a certification error from the server 11. The certification unit 221 notifies the display control unit 225 of a result of the account certification.

The evaluation acquisition unit 222 requests information regarding the progress of preference learning of a user and an evaluation axis that is used to input an evaluation of a content from the server 11 through the transmission unit 211, and receives the pieces of information from the server 11 through the reception unit 212. In addition, the evaluation acquisition unit 222 determines whether a progress rate of the preference learning is equal to or greater than a predetermined threshold value, and notifies the reproduction control unit 223 of a result of the determination. Further, the evaluation acquisition unit 222 supplies the information regarding the progress of the preference learning and the evaluation axis to the display control unit 225.

In addition, the evaluation acquisition unit 222 acquires an evaluation of a content which is input by a user by the use of the input unit 22, and transmits the evaluation to the server 11 through the transmission unit 211. Further, when an operation for resetting an evaluation history is performed by a user by the use of the input unit 22, the evaluation acquisition unit 222 transmits a reset command to the server 11 through the transmission unit 211.

The reproduction control unit 223 controls the reproduction of a content through the reproduction unit 224. In addition, the reproduction control unit 223 requests the server 11 to transmit the content through the transmission unit 211, and receives the content from the server 11 through the reception unit 212. The reproduction control unit 223 supplies the received content to the reproduction unit 224.

The reproduction unit 224 reproduces the content, supplies image data that is acquired as a result of the reproduction to the display control unit 225, and supplies sound data to the sound output control unit 226.

The display control unit 225 controls a display of an image through the display unit 23. For example, the display control unit 225 causes the display unit 23 to display an image based on the image data that is supplied from the reproduction unit 224. In addition, for example, the display control unit 225 causes the display unit 23 to display an operation screen such as a reproduction screen, an evaluation input screen, or a progress display screen which is to be described below.

The sound output control unit 226 controls an output of a sound from the sound output unit 24. For example, the sound output control unit 226 causes the sound output unit 24 to output a sound based on the sound data that is supplied from the reproduction unit 224.

Process of Information Processing System 1

Next, a process of the information processing system 1 will be described.

Content Reproduction Process

First, a content reproduction process that is performed by the client 12 will be described below with reference to flow charts of FIG. 5 and FIG. 6. Meanwhile, for example, this process is started when a user inputs a command to reproduce a content by the use of the input unit 22, and is terminated when the user inputs a command to terminate the reproduction of the content.

In step S1, the body unit 21 performs an initializing process. Specifically, the body unit 21 reads a program that is stored in a storage device (not shown) such as a hard disk drive (HDD) in a main memory (not shown), and performs the initializing process that can be executed by the program.

In step S2, the client 12 receives an input of account information. Specifically, the display control unit 225 causes the display unit 23 to display an input screen of an Account ID and a password. The certification unit 121 acquires the Account ID and the password which are input by a user by the use of the input unit 22.

In step S3, the body unit 21 requests account certification. Specifically, the certification unit 221 generates a command including an Account ID and a password to request account certification (hereinafter, referred to as an account certification request command), and transmits the command to the server 11 through the transmission unit 211.

Figure 17:
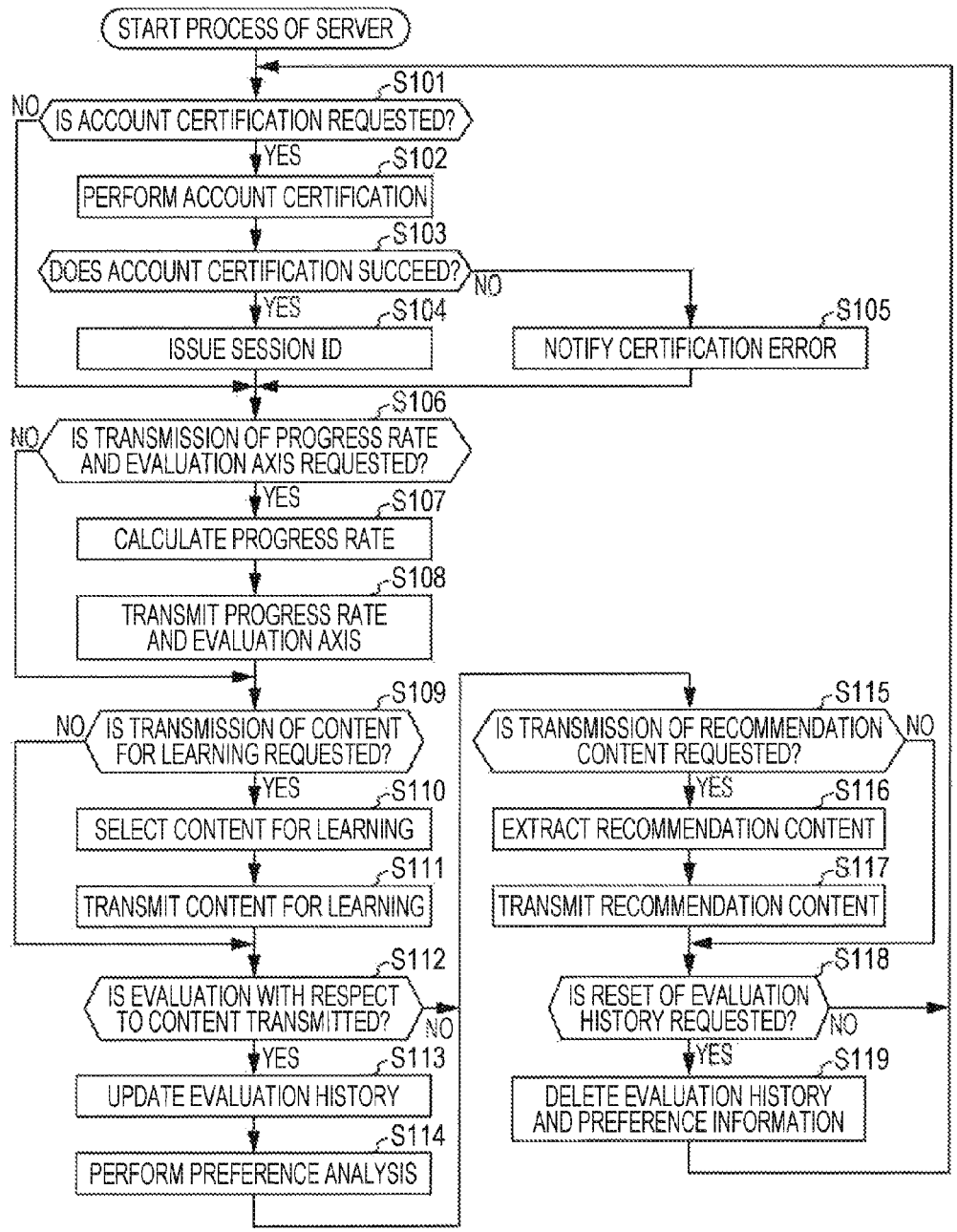
FIG. 17 is a flow chart illustrating a process of a server.

As will be described below with reference to FIG. 17, the server 11 receives the account certification request command through the network 13, and performs the account certification using the Account ID and the password. Then, when the server 11 succeeds in the account certification, the server issues a Session ID for identifying a session through the certified account, and transmits the issued Session ID to the client 12. On the other hand, when the server 11 fails in the account certification, the server transmits information indicating a certification error to the client 12.

In step S4, the certification unit 221 determines whether the account certification succeeds or fails. When the certification unit 221 receives the Session ID from the server 11 through the network 13 and the reception unit 212, the certification unit determines that the account certification succeeds, and the process proceeds to step S5.

In step S5, the evaluation acquisition unit 222 acquires a progress rate and an evaluation axis. Specifically, the evaluation acquisition unit 222 generates a command (hereinafter, referred to as a progress rate evaluation axis request command) for requesting the transmission of a progress rate of preference learning of a user and an evaluation axis that is used to input an evaluation of a content, and transmits the command to the server 11 through the transmission unit 211.

As will be described below with reference to FIG. 17, the server 11 receives the progress rate evaluation axis request command through the network 13. In addition, the server 11 generates a command (hereinafter, referred to as a progress rate evaluation axis transmission command) including information regarding the progress rate of the preference learning of the user and the evaluation axis, and transmits the command to the client 12.

Then, the evaluation acquisition unit 222 receives the progress rate evaluation axis transmission command from the server 11 through the network 13 and the reception unit 212.

FIG. 7 shows examples of the progress rate evaluation axis request command and the progress rate evaluation axis transmission command. A command on the upper side is the progress rate evaluation axis request command, and a command on the lower side is the progress rate evaluation axis transmission command.

Meanwhile, a numeral on the left side of each command denotes a line number of a source code of each command. Hereinafter, unless otherwise noted, it is assumed that a numeral on the left side of each command denotes a line number of a source code even in the figures illustrating an example of another command.

A command to acquire the progress rate and the evaluation axis is shown on the first line of the progress rate evaluation axis request command.

A Session ID of a session for transmitting a command is shown on the second line thereof.

A language that is used by a user in the client 12 is shown on the third line thereof. This is because, for example, a language that is set as a language to be ordinarily used is previously set in the client 12. Alternatively, for example, a language that is selected by a user may be set when creating an account of the content distribution service.

On the other hand, information regarding the progress rate is shown from the second line to the sixth line of the progress rate evaluation axis transmission command. Specifically, a numerical number (0.0) between <Value> and </Value> on the third line denotes the progress rate.

As will be described below, a numerical number (0.5) between <Threshold> and </Threshold> on the fourth line denotes a threshold value for determining which one of a scenario for learning and a scenario for recommendation is carried out. For example, the threshold value is set to a value that is equal to or greater than a minimum learning amount that is necessary to learn a user's preference.

A numerical number (1.0) between <Recommend> and </Recommend> on the fifth line denotes a recommendation value of the progress rate. The recommendation value represents a learning amount that is recommended in order to increase the learning accuracy of user's preference to a certain level or more, and is set to a value that is greater than the threshold value.

In addition, information regarding the evaluation axis is shown from the seventh line to the sixteenth line of the progress rate evaluation axis transmission command. Specifically, a Pivot ID for identifying the type of the evaluation axis and a Language (in this example, Japanese) representing a language used for the evaluation axis are shown on the seventh line thereof.

Information regarding the x-axis of the evaluation axis is shown from the eighth line to the eleventh line thereof. A maximum value and a minimum value of the x-axis are shown on the eighth line thereof. An element (known) with respect to a positive value of the x-axis is shown on the ninth line thereof. An element (unknown) with respect to a negative value of the x-axis is shown on the tenth line thereof. Therefore, in this example, the x-axis serves as an evaluation axis representing a viewpoint regarding whether a content is known or unknown.

Information regarding the y-axis of the evaluation axis is shown from the twelfth line to the fifteenth line thereof.

A maximum value and a minimum value of the y-axis are shown on the twelfth line thereof. An element (like) with respect to a positive value of the y-axis is shown on the thirteenth line thereof. An element (dislike) with respect to a negative value of the y-axis is shown on the fourteenth line thereof. Therefore, in this example, the y-axis serves as an evaluation axis representing a viewpoint regarding whether to like or dislike a content.

Referring back to FIG. 5, in step S6, the evaluation acquisition unit 222 determines whether the progress rate is less than the threshold value. Similarly, when a value of the progress rate shown in the progress rate evaluation axis transmission command is smaller than a threshold value shown in a progress rate table evaluation axis transmission command, the evaluation acquisition unit 222 determines that the progress rate is less than the threshold value, and the process proceeds to step S7. Then, the scenario for learning is carried out.

In step S7, the client 12 acquires a learning content. Specifically, the evaluation acquisition unit 222 notifies the reproduction control unit 223 that the progress rate is less than the threshold value. The reproduction control unit 223 generates a command (hereinafter, a learning content request command) for requesting the transmission of the learning content, and transmits the command to the server 11 through the transmission unit 211.

As will be described below with reference to FIG. 17, the server 11 receives the learning content request command through the network 13, selects the learning content, and transmits the learning content to the client 12.

Then, the reproduction control unit 223 receives the learning content from the server 11 through the network 13 and the reception unit 212.

In step S8, the client 12 starts to reproduce a content. Specifically, the reproduction control unit 223 supplies the learning content received from the server 11 to the reproduction unit 224. The reproduction unit 224 starts to reproduce the learning content, and supplies image data that is acquired through the reproduction to the display control unit 225. The display control unit 225 causes the display unit 23 to display a reproduction screen including an image based on the acquired image data. In addition, the reproduction unit 224 supplies sound data that is acquired through the reproduction of the learning content to the sound output control unit 226. The sound output control unit 226 causes the sound output unit 24 to output a sound based on the acquired sound data. In this manner, the learning content is recommended to a user.

FIG. 8 shows an example of the reproduction screen. Meanwhile, in this drawing, in order to facilitate understanding of the drawing, a background of the reproduction screen is not shown.

An image 301 corresponding to a content that is being reproduced, and an operation guidance 302 are displayed on the reproduction screen. For example, an album including the content that is being reproduced, a single sleeve, or a photo of an artist is used as the image 301.

Referring back to FIG. 5, in step S9, the reproduction control unit 223 determines whether the reproduction of the content is completed. When it is determined that the reproduction of the content has not yet been completed, the process proceeds to step S10.

In step S10, the reproduction control unit 223 determines whether a command to reproduce the next content is given. When it is determined that the command to reproduce the next content is not given, the process proceeds to step S9.

Thereafter, the processes of step S9 and step S10 are repeatedly carried out until it is determined in step S9 that the reproduction of the content is completed or until it is determined in step S10 that the command to reproduce the next content is given.

On the other hand, in step S10, when a user inputs a command to skip a content that is being reproduced and reproduce the next content, by the use of the input unit 22, the reproduction control unit 223 determines that a command to reproduce the next content is given, and the process proceeds to step S11.

In step S11, the reproduction unit 224 stops reproducing the content under the control of the reproduction control unit 223. Then, the process proceeds to step S12.

On the other hand, when it is determined in step S9 that the reproduction of the content is completed, the processes of step S10 and step S11 are skipped, and the process proceeds to step S12.

In step S12, the client 12 receives an evaluation input. Specifically, the display control unit 225 acquires information regarding the evaluation axis from the evaluation acquisition unit 222. The display control unit 225 then causes the display unit 23 to display an evaluation input screen for inputting an evaluation of a content of which the reproduction is completed or a content of which the reproduction is skipped, on the basis of the acquired information regarding the evaluation axis. Therefore, when the progress rate of preference learning is less than a threshold value, the evaluation input screen with respect to the reproduced content or the content of which the reproduction has been stopped partway through is automatically displayed regardless of a user's operation.

Figure 9:
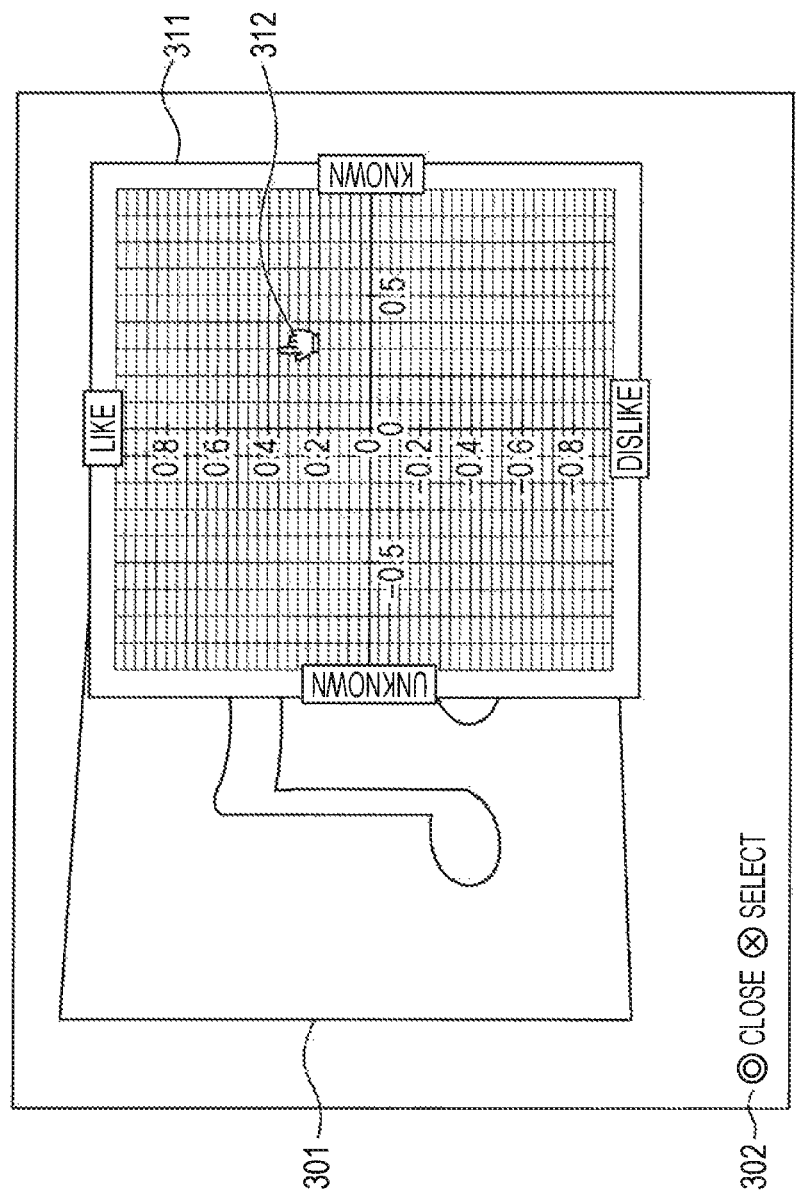
FIG. 9 is a diagram illustrating an example of an evaluation input screen.

FIG. 9 shows an example of the evaluation input screen. The evaluation input screen is a screen in which the reproduction screen of FIG. 8 is overlapped with an evaluation input chart 311.

Figure 10:
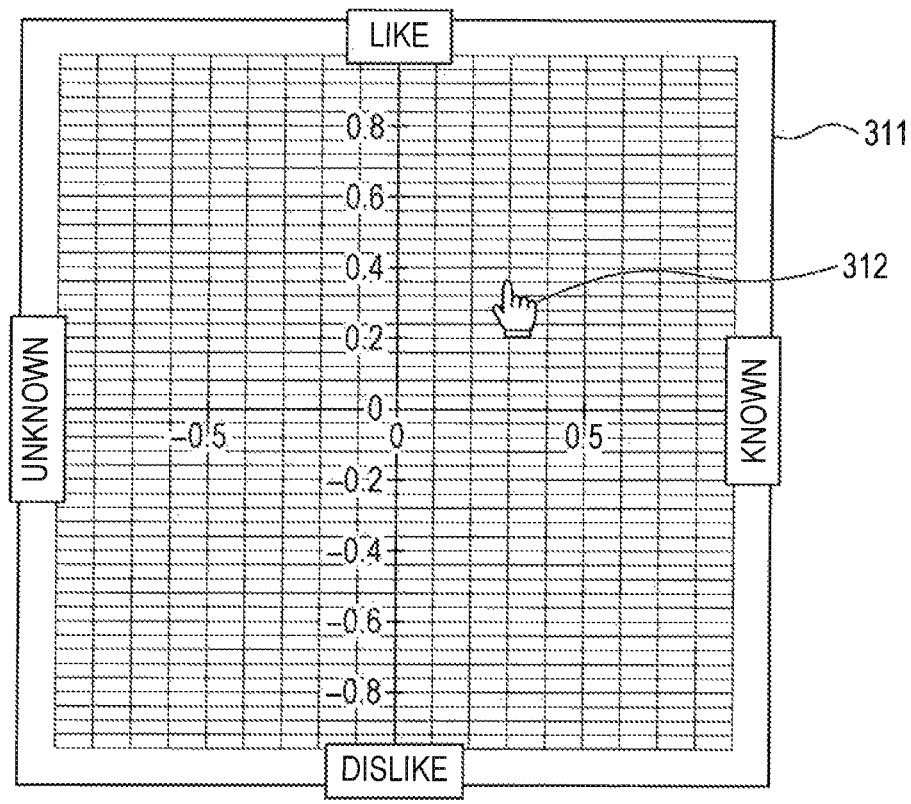
FIG. 10 is an enlarged view of an evaluation input chart.

FIG. 10 is an enlarged view of the evaluation input chart 311. The evaluation input chart 311 is a chart of a rectangular coordinate system that is constituted by two evaluation axes of an x-axis and a y-axis.

The x-axis is an evaluation axis representing a viewpoint (hereinafter, referred to as a viewpoint of known or unknown) regarding whether or not a user knows a target content. The y-axis is an evaluation axis representing a viewpoint (hereinafter, referred to as a viewpoint of like or dislike) regarding whether the user likes or dislikes the target content. The user designates an arbitrary coordinate of the evaluation input chart 311 which is an input region that is defined by the x-axis and the y-axis, and thus the user can input an evaluation value based on the above-described two viewpoints at a time, with respect to the target content.

Specifically, the evaluation value can be input within a range of −1.0 to 1.0 in both the x-axis direction and the y-axis direction. When the user knows the target content, the user sets a value in the x-axis direction to a positive value, and sets the value to a greater value as the degree of knowing the content becomes higher. On the other hand, when the user does not know the target content, the user sets the value in the x-axis direction to a negative value, and sets the value to a smaller value as the degree of not knowing the content becomes higher. In addition, when the user likes the target content, the user sets a value in the y-axis direction to a positive value, and sets the value to a greater value as the degree of liking the content becomes higher. On the other hand, when the user dislikes the target content, the user sets the value in the y-axis direction to a negative value, and sets the value to a smaller value as the degree of disliking the content becomes higher.

Meanwhile, an arbitrary method can be employed as a method of designating a set of coordinates of the evaluation input chart 311. For example, an arbitrary coordinate on the evaluation input chart 311 may be designated through a cursor 312, using a non-contact pointing device such as up, down, left, and right arrow buttons, an analog stick, or a mouse. In addition, for example, when the display unit 23 is a display device capable of inputting an arbitrary point on a screen such as a touch panel, the set of coordinates may be designated by touching an arbitrary coordinate of the evaluation input chart 311.

When the designated coordinate is fixed by pressing, for example, a "selection" button, the evaluation acquisition unit 222 acquires the coordinate on the evaluation input chart 311 which is designated by a user.

Meanwhile, the content evaluations may be individually input for each content, or may be collectively input with respect to a plurality of contents.

Figure 11:
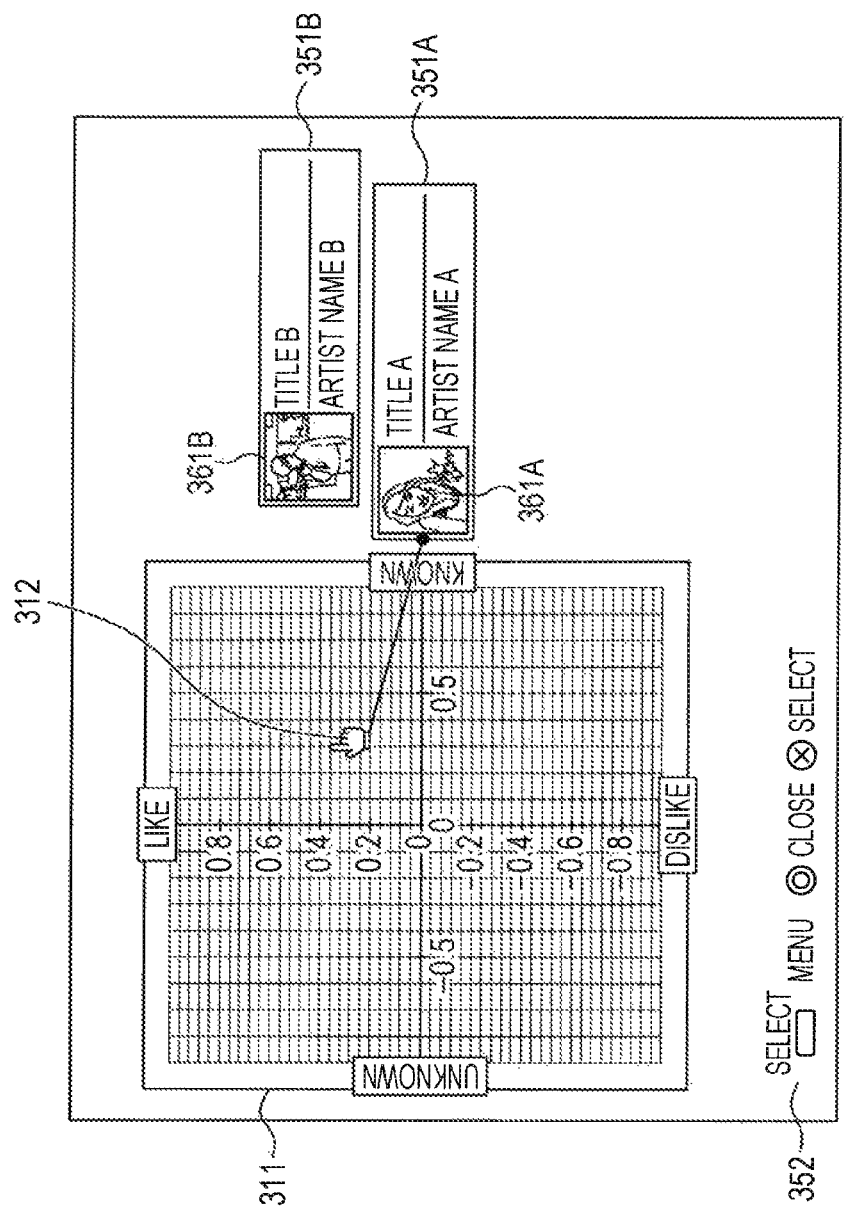
FIG. 11 is a diagram illustrating another example of the evaluation input screen.

FIG. 11 shows an example of the evaluation input screen in a case where evaluations of two contents are collectively input. The evaluation input screen of FIG. 11 is displayed on the display unit 23, for example, every time when the reproduction of the two contents is completed. Meanwhile, in the drawing, the same reference numerals are assigned to components corresponding to those in FIG. 9.

The evaluation input chart 311, content information boxes 351A and 351B, and an operation guidance 352 are displayed on the evaluation input screen.

Information regarding a content to be evaluated is displayed on the content information boxes 351A and 351B.

Images 361A and 361B corresponding to each content are displayed on the left ends of the content information boxes 351A and 351B, respectively. For example, an album including the target content, a single sleeve, a photo of an artist, or the like is used as the images 361A and 361B. In addition, a title and an artist name of each content are displayed on the right sides of the images 361A and 361B.

Figure 12:
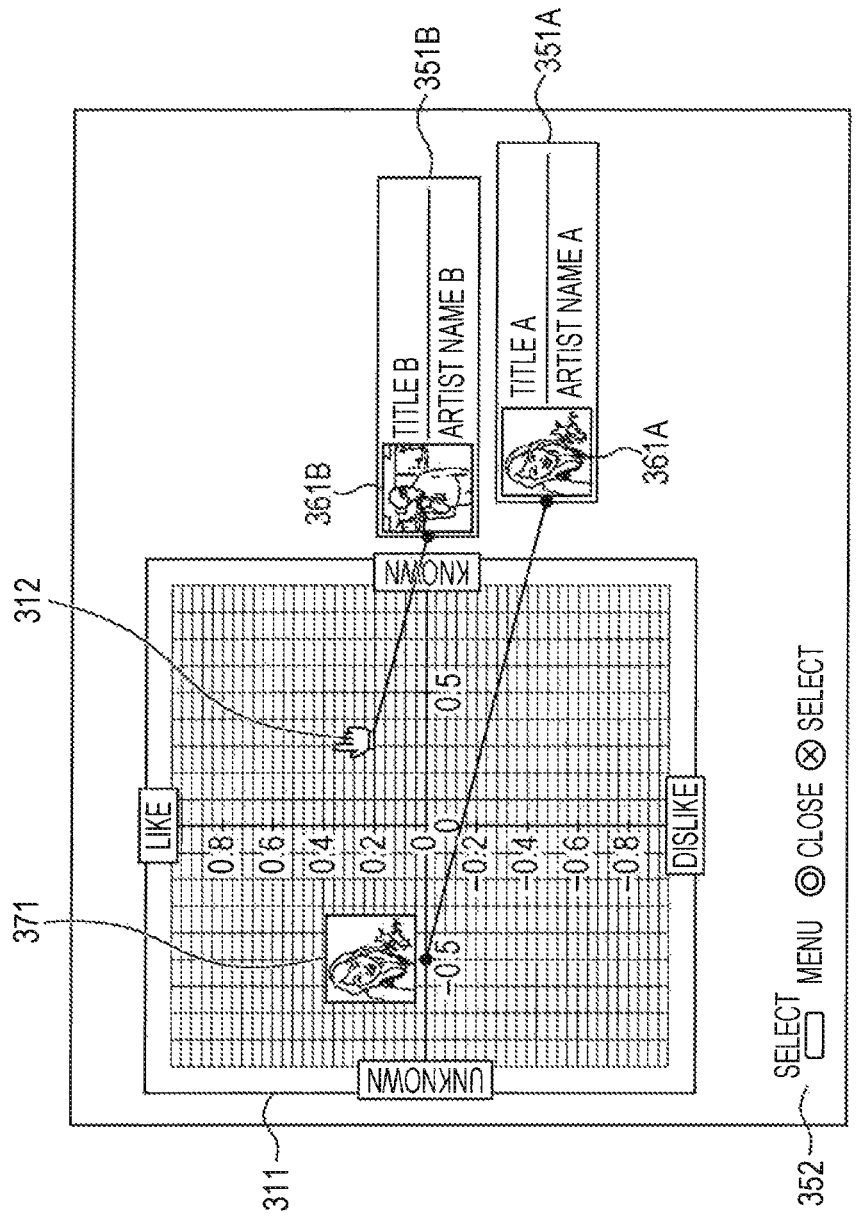
FIG. 12 is a diagram illustrating another example of the evaluation input screen.

For example, a user moves the cursor 312 by the use of the input unit 22, and first inputs an evaluation of a content (hereinafter, referred to as a content A) of which the information is displayed on the content information box 351A. When the evaluation of the content A is fixed, an image 371 corresponding to the content A is displayed in the vicinity of a set of coordinates indicating the fixed evaluation, for example, as shown in FIG. 12. That is, the evaluation of the content A which is input by a user is displayed on the evaluation input chart 311. Then, the user successively inputs the evaluation of a content (hereinafter, referred to as a content B) of which the information is displayed on the content information box 351B, using the same method as the content A.

Thereby, since the user evaluates the two contents while comparing them, there is a strong tendency for the user to clarify a difference between the evaluations of the two contents. Therefore, as compared with a case where an evaluation is input for each content, a difference in evaluations that are given to contents becomes clear, and thus it is possible to expect to improve the accuracy of preference learning.

In addition, for example, the server 11 presents a pair of two learning contents having different characteristics to a user so as to cause the user to input evaluations, and thus it is possible to expect to more effectively learn the preference of the user. Here, the characteristic of the content is, for example, a property (quiet, violent, or the like) of the content, a genre, or a released year.

Meanwhile, evaluations of three or more contents may be collectively input using the same method.

In addition, for example, even when an evaluation is input for each content, an evaluation, which was input in the past by a target user with respect to a content that is different from the content to be evaluated, may be shown on the evaluation input chart 311, in a manner similar to FIG. 12. At this time, all evaluations of contents that were input in the past may be shown on the evaluation input chart 311, and evaluations of latest n (n≥1) contents may be shown on the evaluation input chart 311.

Thereby, similarly to a case where evaluations of a plurality of contents are collectively input, a difference in evaluations that are given to the contents becomes clear, and thus it is possible to expect to improve the accuracy of preference learning.

Referring back to FIG. 5, in step S13, the client 12 transmits an evaluation. Specifically, the evaluation acquisition unit 222 generates a command (hereinafter, referred to as an evaluation transmission command) for transmitting an evaluation that is input by a user, and transmits the command to the server 11 through the transmission unit 211.

Figure 13:
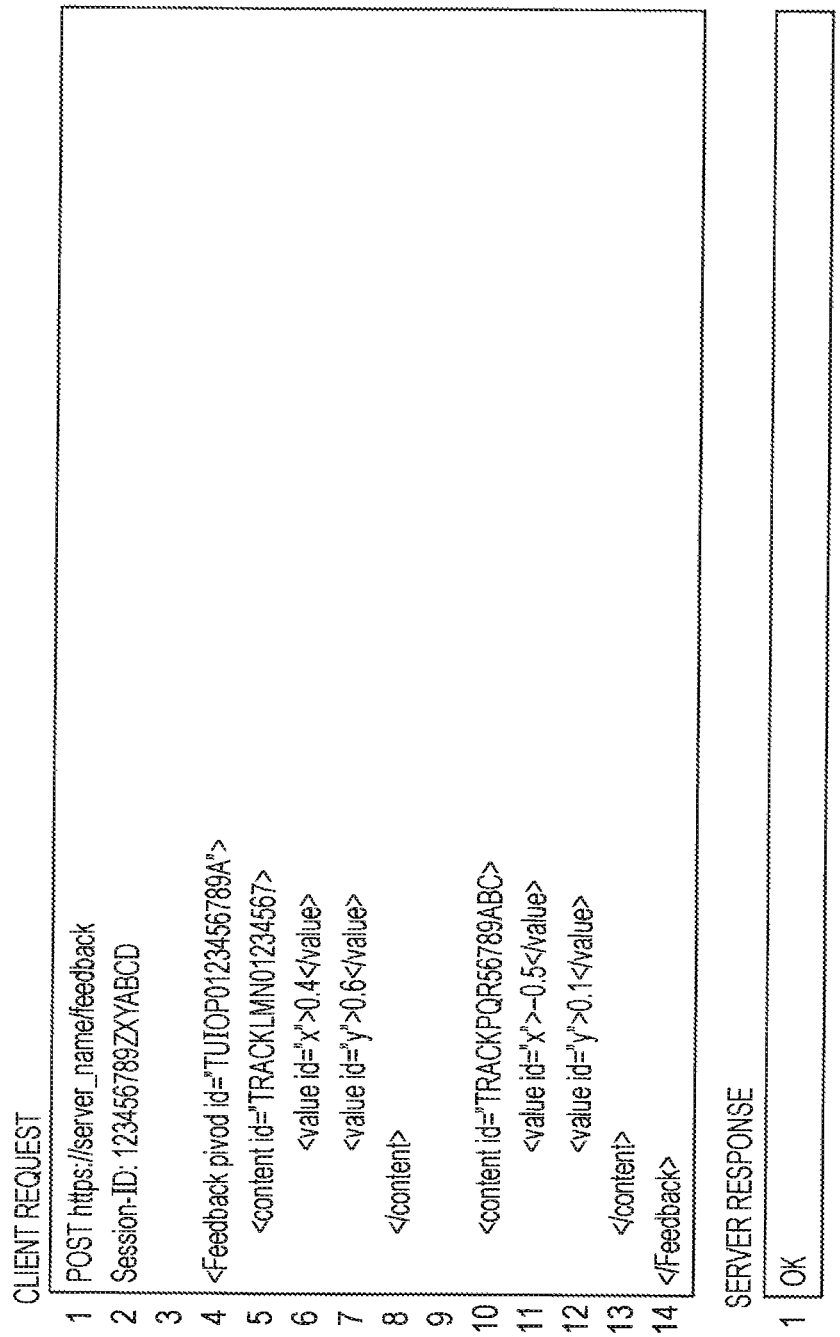
FIG. 13 is a diagram illustrating examples of an evaluation transmission command and a response command.

FIG. 13 shows examples of the evaluation transmission command and a response command of the server 11 with respect to the evaluation transmission command. A command on the upper side is the evaluation transmission command, and a command on the lower side is the response command. Meanwhile, in these examples, an example is shown of a case where evaluations of two contents are collectively input and transmitted.

A command to transmit the evaluation of the content is shown on the first line of the evaluation transmission command.

A Session ID of a session for transmitting the command is shown on the second line thereof.

Evaluations of contents which are given by a user are shown from the fourth line to the fourteenth line thereof. Specifically, a pivot ID indicating the type of an evaluation axis that is used to input the evaluation is shown on the fourth line thereof.

Evaluations that are given to the first content (hereinafter, referred to as a content A) are shown from the fifth line to the eighth line thereof. Specifically, an ID of the content A is shown on the fifth line thereof. Evaluation values with respect to the content A are shown on the sixth line and the seventh line thereof. More specifically, set of coordinates of the x-axis and the y-axis on the evaluation input chart when inputting the evaluation of the content A are shown.

Evaluations that are given to a second content (hereinafter, referred to as a content B) are shown from the tenth line to the thirteenth line thereof. Specifically, an ID of the content B is shown on the tenth line thereof. Evaluation values with respect to the content B are shown on the eleventh line and the twelfth line thereof. More specifically, coordinates of the x-axis and the y-axis on the evaluation input chart when inputting the evaluation of the content B are shown.

Meanwhile, as the evaluation value with respect to the content, the coordinate on the evaluation input chart may be changed to a value that is easily processed by the server 11 and may be transmitted, instead of being transmitted without any change.

Referring back to FIG. 5, thereafter, the process returns to step S5, and the processes of step S5 to step S13 are repeatedly carried out until it is determined in step S6 that the progress rate is equal to or greater than the threshold value.

On the other hand, when it is determined in step S6 that the progress rate is equal to or greater than the threshold value, the process proceeds to step S14. Then, the scenario for recommendation is carried out.

In step S14, the client 12 acquires a recommendation content. Specifically, the evaluation acquisition unit 222 notifies the reproduction control unit 223 that the progress rate is equal to or greater than the threshold value. The reproduction control unit 223 generates a command (hereinafter, referred to as a recommendation content request command) for requesting the transmission of the recommendation content, and transmits the command to the server 11 through the transmission unit 211.

As will be described below with reference to FIG. 17, the server 11 receives the recommendation content request command through the network 13, extracts the recommendation content, and transmits the recommendation content to the client 12.

Then, the reproduction control unit 223 receives the recommendation content from the server 11 through the network 13 and the reception unit 212.

In step S15, similarly to the process of step S8, a content is started to be reproduced. Thus, the recommendation content is recommended to a user.

In step S16, similarly to the process of step S9, it is determined whether the reproduction of the content is completed. When it is determined that the reproduction of the content has not been completed, the process proceeds to step S17.

In step S17, similarly to the process of step S10, it is determined whether a command to reproduce the next content is given. When it is determined that the command to reproduce the next content is not given, the process returns to step S16.

Thereafter, the processes of step S16 and step S17 are repeatedly carried out until it is determined in step S16 that the reproduction of the content is completed or until it is determined in step S17 that the command to reproduce the next content is given.

On the other hand, when it is determined that the command to reproduce the next content is given, the process proceeds to step S18.

In step S18, similarly to the process of step S11, the reproduction of the content is stopped.

Thereafter, the process proceeds to step S19.

On the other hand, when it is determined in step S16 that the reproduction of the content is completed, the processes of step S17 and step S18 are skipped, and the process proceeds to step S19.

In step S19, similarly to the process of step S5, a progress rate and an evaluation axis are acquired.

In step S20, similarly to the process of step S6, it is determined whether the progress rate is less than a threshold value. When it is determined that the progress rate is equal to or greater than the threshold value, the process returns to step S14.

Thereafter, the processes of step S14 to step S20 are repeatedly carried out until it is determined in step S20 that the progress rate is less than the threshold value. Therefore, when the progress rate of preference learning is equal to or greater than the threshold value, the evaluation input screen is displayed by a user's operation, as will be described below with reference to FIG. 14, without being automatically displayed, unlike a case where the progress rate is less than the threshold value.

On the other hand, when it is determined in step S20 that the progress rate is less than the threshold value, the process proceeds to step S21. As will be described below with reference to FIG. 14, this is a case where the progress rate of the preference learning is returned to 0% by resetting of a user's evaluation history during the reproduction of the recommendation content.

In step S21, similarly to the process of step S12, an evaluation input with respect to a content is received.

In step S22, similarly to the process of step S13, the evaluation of the content which is input by a user is transmitted.

Thereafter, the process returns to step S7, and the process of step S7 and the subsequent processes are carried out. That is, a scenario for learning is carried out again, and a learning content is acquired and reproduced.

On the other hand, in step S4, when the certification unit 221 receives information indicating a certification error from the server 11 through the network 13 and the reception unit 212, the certification unit determines that account certification fails, and thus the content reproduction process is terminated.

Option Process

Figure 14:
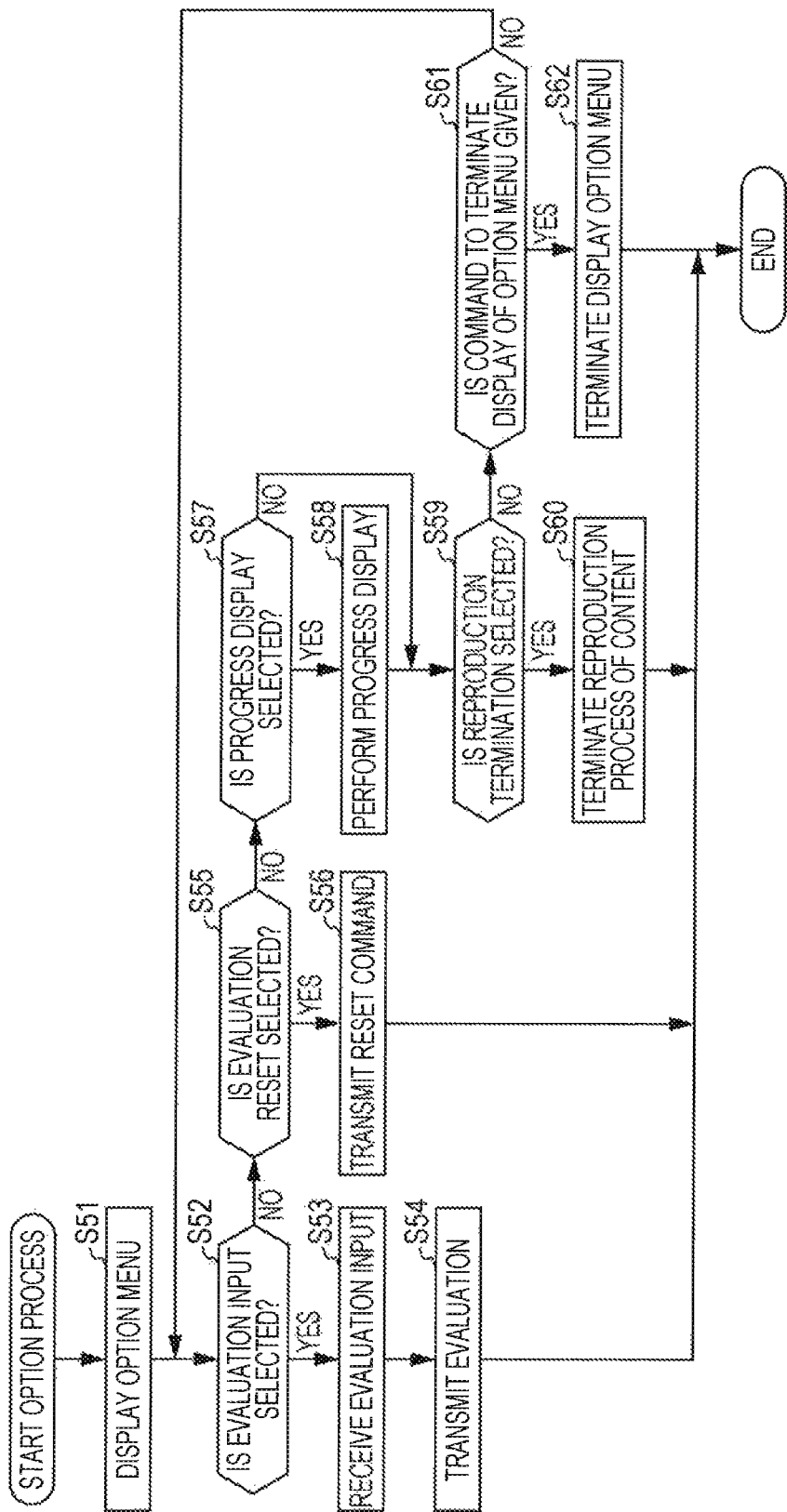
FIG. 14 is a flow chart illustrating an option process.

Next, an option process that is carried out by the client 12 will be described with reference to a flow chart of FIG. 14. Meanwhile, this process is started when a user performs an operation for displaying an option menu by the use of the input unit 22, for example, while or after the learning content or the recommendation content is reproduced.

In step S51, the display unit 23 of the client 12 displays the option menu under the control of the display control unit 225. For example, four items of an evaluation input, an evaluation reset, a progress display, and a reproduction termination are optionally displayed on the option menu.

In step S52, the evaluation acquisition unit 222 determines whether the evaluation input is selected. For example, when a user performs an operation for selecting the evaluation input from the option menu by the use of the input unit 22, the evaluation acquisition unit 222 determines that the evaluation input is selected, and the process proceeds to step S53.

In step S53, similarly to the process of step S12 of FIG. 5, an evaluation input with respect to a content is received.

In step S54, similarly to the process of step S13 of FIG. 5, the evaluation of the content which is input by the user is transmitted.

Thereafter, the option process is terminated.

Thereby, it is also possible to input the evaluation of the content other than after the reproduction of the learning content is completed or after the reproduction of the learning content is skipped. For example, it is possible to input the evaluation during the reproduction of the learning content. In addition, for example, it is also possible to input an evaluation of a content that is recommended from the server 11 by a user's operation, even after a scenario for recommendation is set to be carried out because a progress rate of preference learning is set to be equal to or greater than a threshold value. Thereby, it is possible to further improve the accuracy of the preference learning through the server 11.

On the other hand, in step S52, when it is determined that the evaluation input is not selected, the process proceeds to step S55.

In step S55, the evaluation acquisition unit 222 determines whether the evaluation reset is selected. For example, when the user performs an operation for selecting the evaluation reset from the option menu by the use of the input unit 22, the evaluation acquisition unit 222 determines that the evaluation reset is selected, and the process proceeds to step S56.

In step S56, the evaluation acquisition unit 222 transmits a reset command. Specifically, the evaluation acquisition unit 222 generates the reset command, and transmits the reset command to the server 11 through the transmission unit 211.

As will be described below with reference to FIG. 17, the server 11 receives the reset command through the network 13. The server 11 then resets an evaluation history and preference information of a user who requests the reset.

Thereafter, the option process is terminated.

Figure 15:
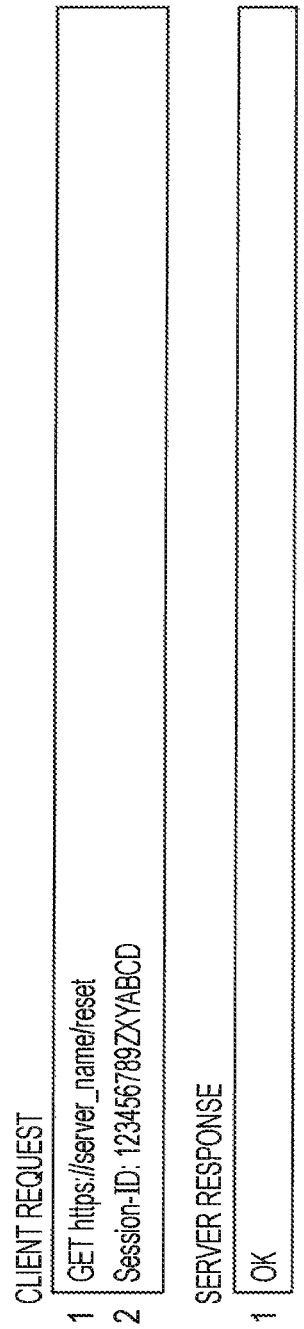
FIG. 15 is a diagram illustrating examples of a reset command and a response command.

FIG. 15 shows examples of a reset command and a response command of the server 11 with respect to the reset command. A command on the upper side is the reset command, and a command on the lower side is the response command.

A command to reset an evaluation history is shown on the first line of the reset command.

A Session ID of a session for transmitting the command is shown on the second line thereof.

Referring back to FIG. 14, on the other hand, when it is determined in step S55 that the evaluation reset is not selected, the process proceeds to step S57.

In step S57, the display control unit 225 determines whether the progress display is selected. For example, when the user performs an operation for selecting the progress display from the option menu by the use of the input unit 22, the display control unit 225 determines that the progress display is selected, and the process proceeds to step S58.

In step S58, the client 12 performs the progress display. Specifically, in step S5 of FIG. 3, the display control unit 225 acquires information regarding the progress rate of the preference learning which is acquired from the server 11, from the evaluation acquisition unit 222. The display control unit 225 then causes the display unit 23 to display a progress display screen showing the progress rate of the preference learning of the user, on the basis of the acquired information.

Figure 16:
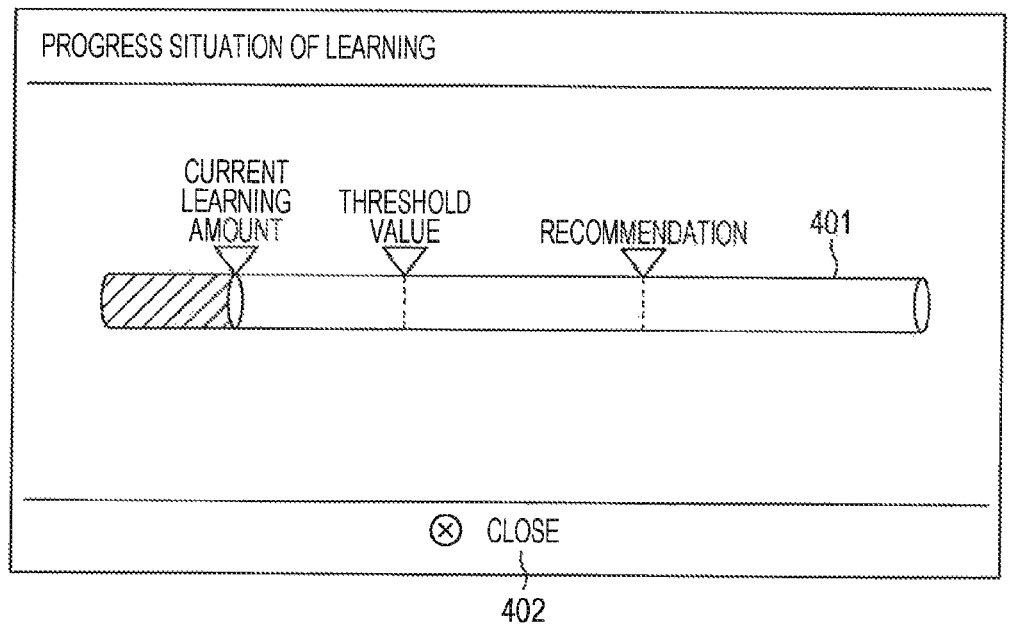
FIG. 16 is a diagram illustrating an example of a progress display screen.

FIG. 16 shows an example of the progress display screen. A graph 401 and an operation guidance 402 are displayed on the progress display screen.

The graph 401 is a horizontal bar graph, and displays a current learning amount, a threshold value, and a recommendation value. These values are displayed on the basis of the values that are set in the above-described progress rate evaluation axis transmission command of FIG. 7.

A user can ascertain a current progress situation of preference learning at a glance by viewing the progress display screen, and can recognize, for example, a difference between the current learning amount, the threshold value, and the recommendation value.

Thereafter, when the progress display screen is closed, the process proceeds to step S59.

On the other hand, when it is determined in step S57 that the progress display is not selected, the process of step S58 is skipped, and the process proceeds to step S59.

In step S59, the reproduction control unit 223 determines whether the reproduction termination is selected. For example, when the user performs an operation for selecting the reproduction termination from the option menu by the use of the input unit 22, the reproduction control unit 223 determines that the reproduction termination is selected, and the process proceeds to step S60.

In step S60, the client 12 terminates the content reproduction process described above with reference to FIG. 5 and FIG. 6. Specifically, the reproduction control unit 223 stops the reproduction of the content through the reproduction unit 224. In addition, the display control unit 225 causes the display of the reproduction screen through the display unit 23 to be terminated.

Thereafter, the option process is terminated.

On the other hand, when it is determined in step S59 that the reproduction termination is not selected, the process proceeds to step S61.

In step S61, the display control unit 225 determines whether a command to terminate the display of the option menu is given. For example, when the user performs an operation for closing the option menu by the use of the input unit 22, the display control unit 225 determines that the command to terminate the display of the option menu is given, and the process proceeds to step 62.

In step S62, the display unit 23 terminates the display of the option menu under the control of the display control unit 225. Thereafter, the option process is terminated.

On the other hand, when it is determined in step S61 that the command to terminate the display of the option menu is not given, the process returns to step S52, and the process of step S52 and the subsequent processes are carried out.

Meanwhile, in the above description, an example has been described where the processes of the evaluation input, the evaluation reset, the progress display, and the reproduction termination are selected from the option menu and carried out. However, for example, the processes may be carried out directly through a predetermined operation without the option menu.

Process of Server 11

Next, a process that is carried out by the server 11 in response to the above-described process of the client 12 will be described with reference to a flow chart of FIG. 17.

In step S101, the certification unit 121 determines whether account certification is requested. When the certification unit 121 receives the account certification request command that is transmitted from the client 12 in step S3 of FIG. 5 through the network 13 and the reception unit 112, the certification unit determines that the account certification is requested, and the process proceeds to step S102.

In step S102, the certification unit 121 performs the account certification. That is, the certification unit 121 collates an Account ID and a password which are included in the account certification request command with an Account ID and a password of each account which are registered in the user information storage unit 144.

In step S103, the certification unit 121 determines whether the account certification succeeds. When an account that is consistent with the Account ID and the password which are included in the account certification request command is registered in the user information storage unit 144, as a result of the process of step S102, the certification unit 121 determines that the account certification succeeds, and the process proceeds to step S104.

In step S104, the certification unit 121 issues a Session ID. Specifically, the certification unit 121 issues a new Session ID in order to distinguish the client 12 that succeeds in the account certification and a session that is newly started, from another session. The certification unit 121 transmits the issued Session ID to the client 12 that requests the account certification, through the transmission unit 111.

Thereafter, the process proceeds to step S106.

Meanwhile, FIG. 18 shows an example of a session table for managing the Session ID that is issued by the certification unit 121. The session table includes a Session ID, an Account ID, and a Session expire date that indicates an expiration date of a session.

On the other hand, when it is determined in step S103 that the account certification fails, the process proceeds to step S105.

In step S105, the certification unit 121 notifies a certification error. Specifically, the certification unit 121 transmits information indicating the certification error to the client 12 that requests the account certification, through the transmission unit 111.

Thereafter, the process proceeds to step S106.

On the other hand, when it is determined in step S101 that the account certification is not requested, the processes of step S102 to step S105 are skipped, and the process proceeds to step S106.

In step S106, the evaluation collection unit 131 determines whether the transmission of a progress rate and an evaluation axis are requested. When the evaluation collection unit 131 receives the above-described progress rate evaluation axis request command that is transmitted from the client 12 in step S5 of FIG. 5, through the reception unit 112, the evaluation collection unit determines that the transmission of the progress rate and the evaluation axis is requested, and the process proceeds to step S107.

In step S107, the evaluation collection unit 131 calculates the progress rate. Specifically, the evaluation collection unit 131 obtains an Account ID of a target user from the Session ID that is included in the progress rate evaluation axis request command, using the session table.

In addition, the evaluation collection unit 131 extracts an evaluation history of the target user from an evaluation history table that is accumulated in the evaluation history storage unit 141, on the basis of the obtained Account ID.

FIG. 19 shows an example of the evaluation history table. The evaluation history table includes items of an "Account ID", a "Pivot ID", a "Content ID", an "Evaluation", and a "Date".

In the "Account ID", an Account ID of a user who gives an evaluation is set.

In the "Pivot ID", a Pivot ID of an evaluation axis used for the evaluation is set.

In the "Content ID", a Content ID of a content to which the evaluation is given is set.

In the "Evaluation", an Evaluation value that is given to the content is set.

In the "Date", a date to which the evaluation is given is set.

Then, the evaluation collection unit 131 calculates a progress rate up to a target number of evaluations (that is, a threshold value), for example, on the basis of a number of evaluations (a past number of evaluations of a content) of a user.

In step S108, the evaluation collection unit 131 transmits the progress rate and the evaluation axis. Specifically, the evaluation collection unit 131 generates the above-described progress rate evaluation axis transmission command shown in FIG. 7, and transmits the progress rate evaluation axis transmission command to the client 12, which is a requestor, through the transmission unit 111.

Thereafter, the process proceeds to step S109.

Meanwhile, the evaluation axis that is provided to the client 12 from the server 11 may be fixed to one type, or a plurality of types of evaluation axes may be provided. When the plurality of types of evaluation axes are provided, for example, the evaluation axis to be provided may be changed on the basis of a predetermined condition. Specifically, for example, it is possible to change the evaluation axis to be provided, on the basis of a number of evaluations (a progress rate of preference learning) or with a predetermined cycle time.

Here, reference will be made to FIG. 20 and FIG. 21 to describe a detailed example of a case of changing an evaluation axis that is provided on the basis of a number of evaluations. FIG. 20 shows an example of an axis condition setting table, and FIG. 21 shows an example of an axis information setting table.

The axis condition setting table includes items of a "condition" and a "Pivot ID".

In the "condition", a condition for determining an evaluation axis to be provided is set.

In the "Pivot ID", a Pivot ID is set indicating the type of an evaluation axis that is provided when the corresponding condition is satisfied.

In the example of FIG. 20, conditions are set such that the Pivot ID provides an evaluation axis of TUJIOP0123456789A when the number of evaluations is equal to or less than 50 times while the Pivot ID provides an evaluation axis of TUIOP8901234567B when the number of evaluations exceeds 50 times.

The axis information setting table includes items of a "Pivot ID", a "Language", and a "Configuration".

In the "Pivot ID", a Pivot ID of a target evaluation axis is set.

In the "Language", a language that is used for the evaluation axis is set.

In the "Configuration", details of the evaluation axis are set. In information regarding the evaluation axis within the progress rate evaluation axis transmission command described above with reference to FIG. 7, contents of the "Language" and the "Configuration" are set.

In this example, information regarding three types of evaluation axes is set.

Specifically, in a first evaluation axis, the Pivot ID is set to TUIOP0123456789A, and the use language is set to Japanese. In addition, a maximum value of an x-axis is set to 1.0, a minimum value thereof is set to −1.0, an element with respect to a positive value of the x-axis is set to "known", and an element with respect to a negative value thereof is set to "unknown". Further, a maximum value of a y-axis is set to 1.0, a minimum value thereof is set to −1.0, an element with respect to a positive value of the y-axis is set to "like", and an element with respect to a negative value thereof is set to "dislike". In addition, a value of <compare> is set to two_pair. This indicates that when the evaluation axis is used, an evaluation input is performed while comparing two contents, as described above with reference to FIG. 11 and FIG. 12.

In a second evaluation axis, the Pivot ID is set to TUIOP8901234567B, and the use language is set to Japanese. In addition, a maximum value of an x-axis is set to 1.0, a minimum value thereof is set to −1.0, an element with respect to a positive value of the x-axis is set to "happy", and an element with respect to a negative value thereof is set to "sad". Further, a maximum value of a y-axis is set to 1.0, a minimum value thereof is set to −1.0, an element with respect to a positive value of the y-axis is set to "comfortable", and an element with respect to a negative value thereof is set to "uncomfortable". In addition, a value of <compare> is set to false. This indicates that when the evaluation axis is used, an evaluation is input for each content.

In a third evaluation axis, the Pivot ID is set to TUIOP0123456789A, and the use language is set to English.

That is, the first evaluation axis and the third evaluation axis are evaluation axes having the same contents, and have different use languages. In addition, a maximum value of an x-axis is set to 1.0, a minimum value thereof is set to −1.0, an element with respect to a positive value of the x-axis is set to "Well known", and an element with respect to a negative value thereof is set to "Unknown". Further, a maximum value of a y-axis is set to 1.0, a minimum value thereof is set to −1.0, an element with respect to a positive value of the y-axis is set to "Like", and an element with respect to a negative value thereof is set to "Dislike". In addition, a value of <compare> is set to two_pair.

In this manner, it is possible to collect evaluations based on more viewpoints by using the plurality of types of evaluation axes. As a result, it is possible to improve the accuracy of preference learning.

Referring back to FIG. 17, on the other hand, when it is determined in step S106 that the transmission of the progress rate and the evaluation axis is not requested, the processes of step S107 and step S108 are skipped, and the process proceeds to step S109.

In step S109, the recommendation unit 123 determines whether the transmission of a learning content is requested.

When the recommendation unit 123 receives the above-described learning content request command that is transmitted from the client 12 in step S7 of FIG. 5, through the network 13 and the reception unit 112, the recommendation unit determines that the transmission of the learning content is requested, and the process proceeds to step S110.

In step S110, the recommendation unit 123 selects the learning content. For example, similarly to a case of extracting a recommendation content to be described below, the recommendation unit 123 extracts the learning content from contents that are accumulated in the content storage unit 143, on the basis of the previous results of the preference learning of a user who is a requestor. Meanwhile, when the preference learning of the user who is a requestor is immature, in other words, when the progress rate of the preference learning of the user who is a requestor is low, a popular content having a high evaluation of other users or a new content that is recently added may be mixed with the extracted learning content.

In a step of immature preference learning, a content that is considerably separated from the preference of the user who is a requestor is sometimes recommended, but it is possible to prevent the user from feeling bored by mixing in the popular content or the new content. In addition, a variation in the recommended content expands, and thus it is possible to more effectively acquire an evaluation of the user.

Alternatively, for example, the learning content may be selected on the basis of properties, such as the age or gender of the user who is a requestor, or a prior questionnaire (for example, a favorite genre).

Alternatively, for example, the learning content may be randomly selected regardless of the results of the preference learning of the user.

In step S111, the recommendation unit 123 transmits the selected learning content to the client 12 which is a requestor, through the transmission unit 111.

Thereafter, the process proceeds to step S112.

On the other hand, when it is determined in step S109 that the transmission of the learning content is not requested, the processes of step S110 and step S111 are skipped, and the process proceeds to step S112.

In step S112, the evaluation collection unit 131 determines whether an evaluation of a content is transmitted. When the evaluation collection unit 131 receives the above-described evaluation transmission command that is transmitted from the client 12 in step S13 of FIG. 5, through the network 13 and the reception unit 112, the evaluation collection unit determines that the evaluation of the content is transmitted, and the process proceeds to step S113.

In step S113, the evaluation collection unit 131 updates an evaluation history. That is, the evaluation collection unit 131 adds an evaluation of a content which is newly acquired, to the above-described evaluation history table of FIG. 19.

In step S114, the preference analysis unit 132 performs a preference analysis. Specifically, the preference analysis unit 132 extracts an evaluation history of a user (hereinafter, referred to as a target user) who newly gives an evaluation of a content, from the evaluation history table that is accumulated in the evaluation history storage unit 141. The preference analysis unit 132 then analyzes the preference of the target user with respect to the content by using a predetermined method, on the basis of the extracted evaluation history.

For example, when an evaluation is given using the above-described evaluation input chart 311 of FIG. 10, the preference analysis unit 132 obtains a deviation width of evaluation values based on a viewpoint of like or dislike and a deviation width of evaluation values based on a viewpoint of known or unknown, which have been given so far by the target user. Meanwhile, it is possible to use a difference between a maximum value and a minimum value of the evaluation value, the distribution of the evaluation values, or the like as the deviation width. In addition, the preference analysis unit 132 normalizes the evaluation values that have been given thus far to each content by the target user so that each deviation width is set to be a predetermined value.

The preference analysis unit 132 performs an analysis of the preference of the target user with respect to a content by using a predetermined method, on the basis of the normalized evaluation values. The preference analysis unit 132 causes the preference information storage unit 142 to store preference information indicating a characteristic, a tendency, or the like of the preference of the target user with respect to the content, which is obtained as a result of the analysis.

Meanwhile, an arbitrary method can be employed as a method of analyzing the preference through the preference analysis unit 132. For example, when an evaluation is given using the evaluation input chart 311 of FIG. 10, the preference analysis unit 132 classifies the target user into one or more clusters of a user who is more likely to give a positive evaluation (like) to a content that the user knows, a user who is more likely to give a negative evaluation (dislike) to a content that the user knows, a user who is more likely to give a positive evaluation (like) to a content that the user does not know, or a user who is more likely to give a negative evaluation (dislike) to a content that the user does not know. The preference analysis unit 132 then causes the preference information storage unit 142 to store the classified results as the preference information of the target user.

Thereafter, the process proceeds to step S115.

On the other hand, when it is determined in step S112 that the evaluation of the content is not transmitted, the processes of step S113 and step S114 are skipped, and the process proceeds to step S115.

In step S115, the recommendation unit 123 determines whether the transmission of the recommendation content is requested. When the recommendation unit 123 receives the above-described recommendation content request command that is transmitted from the client 12 in step S14 of FIG. 6, through the network 13 and the reception unit 112, the recommendation unit determines that the transmission of the recommendation content is requested, and the process proceeds to step S116.

In step S116, the recommendation unit 123 extracts the recommendation content. Specifically, the recommendation unit 123 reads out the preference information of the user who is a requestor, from the preference information storage unit 142. The recommendation unit 123 then extracts a content that is recommended to the user who is a requestor from the contents that are accumulated in the content storage unit 143, on the basis of the preference information of the user who is a requestor.

Meanwhile, an arbitrary method, for example, content based filtering (CBF) or collaborative filtering (CF), can be employed as a method of extracting the recommendation content through the recommendation unit 123. In addition, for example, when a user is classified into a plurality of clusters as described above, a different recommendation rule may be applied on the basis of the cluster to which the user belongs.

For example, a recommendation rule in which a new content is preferentially extracted from contents close to the user's preference is applied to a user belonging to the cluster of the user who is more likely to give a positive evaluation to a content that the user does not know. On the other hand, for example, a recommendation rule in which a content of an artist that the user knows is preferentially extracted from contents close to the user's preference is applied to a user belonging to the cluster of the user who is more likely to give a negative evaluation to a content that the user does not know. Meanwhile, it is possible to ascertain the artist that the user knows, by extracting an ID of a content that is evaluated to be known from the past evaluation history of the user and by obtaining an artist of the extracted content.

In step S117, the recommendation unit 123 transmits the extracted recommendation content to the client 12 of the user through the transmission unit 111.

Thereafter, the process proceeds to step S118.

On the other hand, when it is determined in step S115 that the transmission of the recommendation content is not requested, the processes of step S116 and S117 are skipped, and the process proceeds to step S118.

In step S118, the evaluation collection unit 131 determines whether a reset of the evaluation history is requested. When the evaluation collection unit 131 receives the above-described reset command that is transmitted from the client 12 in step S56 of FIG. 14, through the network 13 and the reception unit 112, the evaluation collection unit determines that the reset of the evaluation history is requested, and the process proceeds to step S119.

In step S119, the learning unit 122 deletes the evaluation history and the preference information. Specifically, the evaluation collection unit 131 deletes the evaluation history of the user who is a requestor from the evaluation history table that is stored in the evaluation history storage unit 141. In addition, the preference analysis unit 132 deletes the preference information of the user who is a requestor, which is obtained through learning based on the deleted evaluation history, from the preference information storage unit 142. As a result, the preference learning of the user who is a requestor is started again from the beginning.

Thereby, it is possible to start the preference learning again at an arbitrary timing at the will of the user. For example, it is possible to start the preference learning again in a case where a content to be recommended is dissociated from a user's preference for reasons, for example, that the user wrongly inputs an evaluation, the user's preference is changed, or the user inputs an evaluation when the user lends the client 12 to another user. In addition, it is possible to start the preference learning again, for example, when it is desired to avoid the recommendation of only contents that are inclined to the user's preference and to change the content to be recommended.

Thereafter, the process returns to step S101, and the process of step S101 and the subsequent processes are carried out.

On the other hand, when it is determined in step S118 that the reset of the evaluation history is not requested, the process returns to step S101, and the process of the step S101 and the subsequent processes are carried out.

In this manner, the user can easily input evaluations of a content based on a plurality of viewpoints by a simple and intuitive operation. Therefore, the amount of evaluations of the content which are fed back from the user increases, and a variation in the evaluation increases, and thus it is possible to collect evaluations that are effective for the preference learning of each user. As a result, the accuracy of the preference learning is improved. Accordingly, the user can receive a content that is more consistent with preference, and thus the satisfaction increases.

In addition, since the evaluation input screen is not basically displayed after a learning amount reaches a predetermined level, the user is prevented from feeling bothered. Further, since it is possible to input an evaluation of a content at the will of the user even after the learning amount reaches the predetermined level, the user can carry out the preference learning until he or she is satisfied.

In addition, the user can ascertain whether the reason why the content to be recommended is dissociated from his or her preference is because the preference learning is immature, or because a content that is consistent with his or her preference is not detected, by displaying the progress rate of the preference learning. Then, it is possible to prevent the user from having a negative false impression that his or her preferred content is not present, with respect to the content distribution service, regardless of the reason of immature preference learning. In addition, it is possible to give a motivation for actively inputting an evaluation of a content or for increasing a use time or a use frequency of a service to the user, by displaying the progress rate.

In addition, since the evaluation axis used to input an evaluation can be changed from the server 11, it is possible to flexibly change a viewpoint of an evaluation that is collected from each user, in accordance with a progress situation of the preference learning of each user or when a method of the preference learning is tuned.

2. Modified Example

Hereinafter, a modified example of the above-described embodiment of the present disclosure will be described.

Modified Example 1

Modified Example Regarding Evaluation Input Screen

It is possible to use a coordinate system other than the above-described biaxial rectangular coordinate system as a coordinate system of an evaluation input chart. For example, other coordinate systems such as an oblique coordinate system, a polar coordinate system, a parabolic coordinate system, or a generalized coordinate system can be used.

In addition, it is also possible to use a spatial coordinate system that is defined by three or more axes.

For example, when a triaxial rectangular coordinate system is used, a user can input an evaluation of a content by designating an arbitrary coordinate of an input space that is defined by three axes.

Further, for example, it is possible to use a polygonal plane coordinate system such as a pentagon-shaped plane coordinate system that is constituted by five axes or a hexagonal plane coordinate system in which three axes intersect with each other at one point, or a spatial coordinate system including the polygonal plane coordinate system.

In addition, for example, when the biaxial rectangular coordinate system is used, a number of quadrants that are used in the evaluation input chart is sometimes limited, according to properties of a viewpoint used for the evaluation. For example, when only the degree of like of a content is input and the degree of dislike is not necessary to be input, using the evaluation input chart that is constituted by a first quadrant and a second quadrant of the evaluation input chart 311 of FIG. 10 can be considered.

Further, for example, the evaluation axes may be disposed in parallel within a screen without crossing. In this case, an evaluation is necessary to be input for each viewpoint, but it is possible to input evaluations based on a plurality of viewpoints in one screen.

In addition, when three or more types of viewpoints to be evaluated are present, the evaluation input chart may be divided into two or more parts through a combination of different evaluation axes. For example, it may be considered that evaluations based on four types of viewpoints can be input by dividing the evaluation input chart into an evaluation input chart A that is defined by two axes representing two types of viewpoints of like or dislike and known or unknown, and a second evaluation input chart B that is defined by an axis representing two types of viewpoints of happy or sad and comfortable or uncomfortable. In this case, for example, the evaluation input chart A and the evaluation input chart B may be displayed within the same screen, or may be displayed on different screens by switching. In the later case, for example, the evaluation input chart B being displayed after an evaluation of the evaluation input chart A is input may be considered.

Further, in the above description, an example has been described where an evaluation value according to a designated coordinate within an evaluation input chart is given, but an evaluation may be input by designating only a quadrant of the evaluation input chart (in other words, a square of the evaluation input chart). For example, in the case of the evaluation input chart 311 of FIG. 10, it is possible to input evaluations of an item from four options of like and known (a first quadrant), like and unknown (a second quadrant), dislike and unknown (a third quadrant), or dislike and known (a fourth quadrant).

Modified Example 2

Modified Example of Process Sharing

The above-described process sharing of the server 11 and the client 12 is an example, and can be arbitrarily changed. For example, it is possible to transfer some functions of the server 11 to the client 12 or transfer some functions of the client 12 to the server 11. In the former case, for example, it is possible for the preference learning of the user to be performed in the client 12. In addition, in the later case, for example, it is possible to cause the server 11 to control a display of the evaluation input screen or the like in the client 12, by providing display control data to the client 12 from the server 11.

Figure 22:
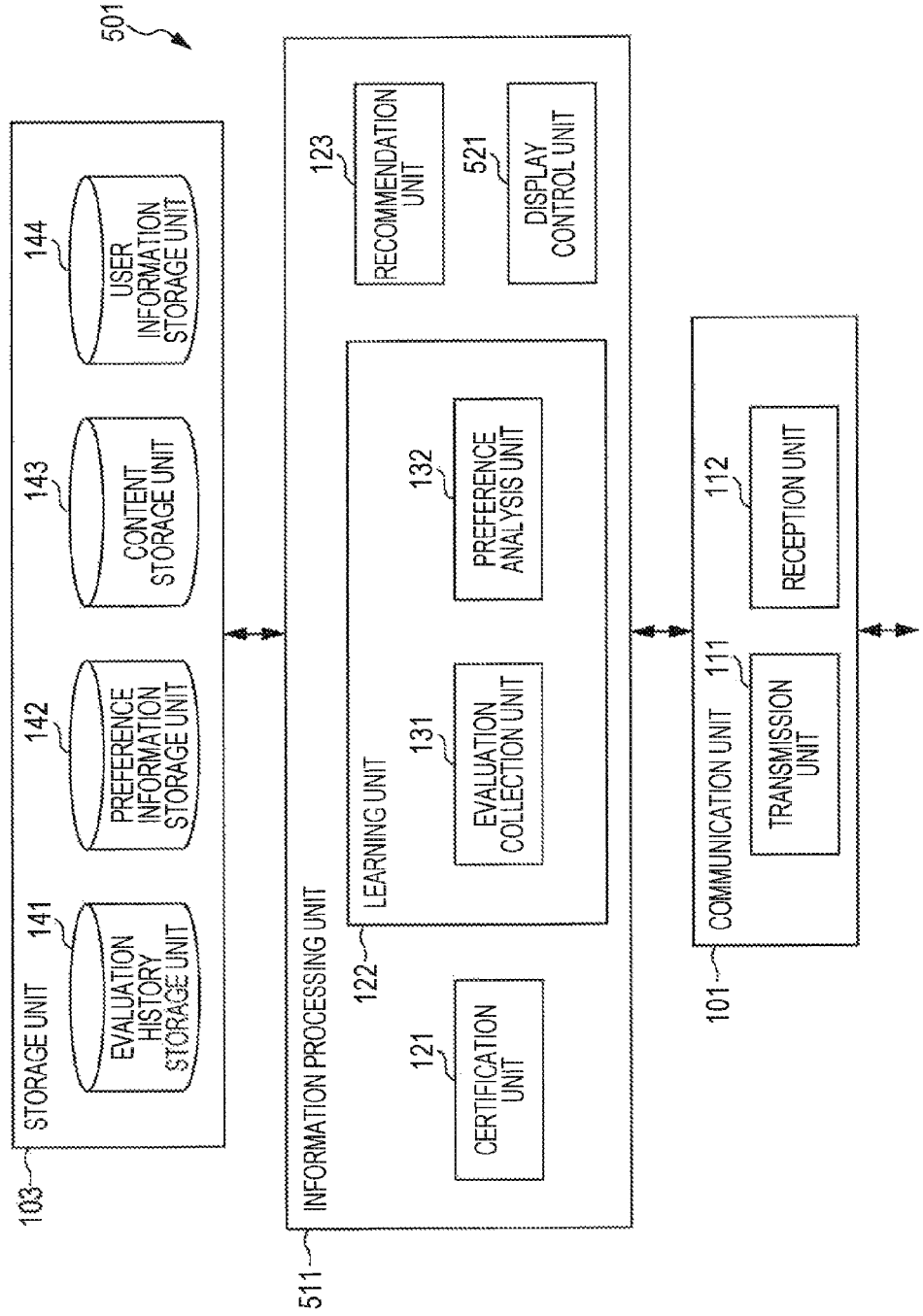
FIG. 22 is a block diagram illustrating a modified example of a functional configuration of a server.

FIG. 22 shows an example of a functional configuration of the server in a case where the server controls the display of the evaluation input screen or the like in the client. Meanwhile, in the drawing, the same reference numerals are assigned to components corresponding to those in FIG. 3.

A server 501 of FIG. 22 is different from the server 11 of FIG. 3 in that an information processing unit 511 is provided instead of the information processing unit 102. The information processing unit 511 is different from the information processing unit 102 in that a display control unit 521 is added.

The display control unit 521 controls the display of the evaluation input screen or the like in the client 12 by transmitting predetermined display control data to the client 12 through the transmission unit 111. Meanwhile, the display control data includes, for example, a program or parameters for display.

In addition, for example, information regarding an evaluation axis that is defined in a service may be previously stored in the client 12 without inquiring an evaluation axis to be used to the server 11 from the client 12 each time, and the information may be used.

Further, in the above description, an example has been described in which the client 12 acquires a progress rate and a threshold value from the server 11, but a threshold value that is previously defined in the client 12 may be used.

In addition, for example, only a list of learning contents or recommendation contents may be provided to the client 12 from the server 11, and a content may be acquired from another server on the basis of the list that is acquired by the client 12.

Further, for example, it is also possible to incorporate the function of the server 11 in the client 12, to cause the client 12 to learn a user's preference in a stand-alone manner, and to cause the client to recommend a content held by itself to the user.

In addition, the server 11 and the client 12 are not necessary to be typically connected to each other, and for example, evaluations that are input by a user in an offline state may be accumulated in the client 12, and the evaluations may be collectively transmitted to the server 11 in an online state.

Modified Example 3

Modified Example of Item to be Recommended

An item that is recommended using the present disclosure is not limited to the above-described example. For example, the present disclosure can also be applied to a case where various contents using characters, sounds, images, or the like of a video, a book, a game, software, a website, news, an advertisement, or the like, in addition to music are recommended.

Further, the present disclosure can also be applied to a case of recommending to a user or the like an item other than a content, for example, various products or a social service.

In addition, viewpoints used for an evaluation are not limited to the above-described examples, and an arbitrary viewpoint can be employed according to the type or the like of an item to be recommended.

Configuration Example of Computer

The above-described series of processes can be performed by hardware, or can be performed by software. When the series of processes are performed by software, a program that constitutes the software is installed in a computer. Here, for example, the computer includes a computer that is incorporated in dedicated hardware, a general-purpose personal computer that can carry out various functions by installing various programs, or the like.

Figure 23:
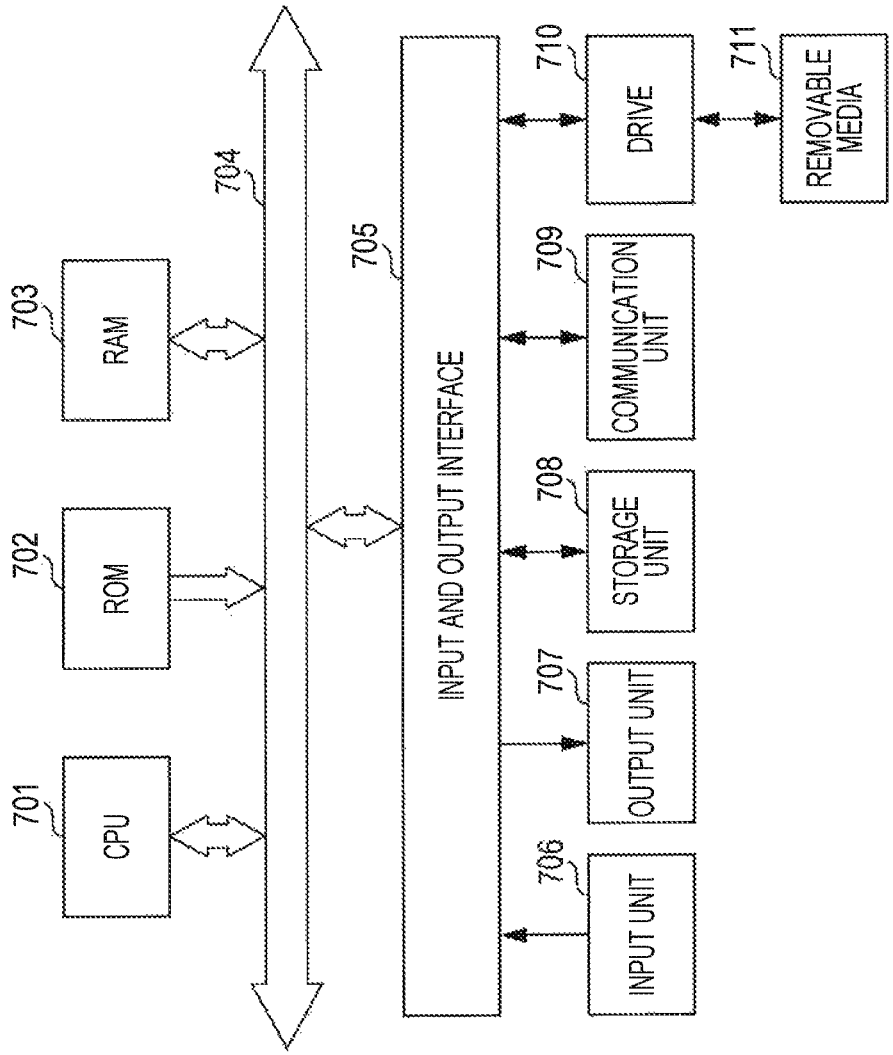
FIG. 23 is a block diagram illustrating a configuration example of a computer.

FIG. 23 is a block diagram illustrating a configuration example of hardware of a computer which executes the above-described series of processes by a program.

In the computer, a central processing unit (CPU) 701, a read only memory (ROM) 702, and a random access memory (RAM) 703 are connected to each other by a bus 704.

Further, an input/output interface 705 is connected to the bus 704. An input unit 706, an output unit 707, a storage unit 708, a communication unit 709, and a drive 710 are connected to the input/output interface 705.

The input unit 706 is constituted by a keyboard, a mouse, a microphone, or the like. The output unit 707 is constituted by a display, a speaker, or the like. The storage unit 708 is constituted by a hard disk, a non-volatile memory, or the like. The communication unit 709 is constituted by a network interface, or the like. The drive 710 drives a removable media 711 such as a magnetic disk, an optical disc, a magneto-optical disc, or a semiconductor memory.

In the computer configured as described above, for example, the CPU 701 loads a program that is stored in the storage unit 708 in the RAM 703 and executes the program through the input/output interface 705 and the bus 704, and thus the above-described series of processes are performed.

The program that is executed by the computer (CPU 701) can be recorded in the removable media 711 as, for example, a package media, and can be provided. In addition, the program can be provided through a wired or wireless transmission medium such as a local area network, the Internet, or digital satellite broadcasting.

In the computer, the program can be installed in the storage unit 708 through the input/output interface 705, by installing the removable media 711 in the drive 710. In addition, the program can be received in the communication unit 709 through the wired or wireless transmission medium, and can be installed in the storage unit 708. Furthermore, the program can be previously installed in the ROM 702 or the storage unit 708.

Meanwhile, the program that is executed by the computer may be a program that is sequentially processed in the order described in the specification, or may be a program that is processed in parallel or at a necessary timing, for example, when an invocation is performed.

In addition, in the specification, a system refers to a collection of a plurality of components (a device, a module (product), and the like), and it does not matter whether all the components are within one housing. Therefore, both a plurality of devices that are accommodated in separate housings and are connected to each other through a network and one device in which a plurality of modules are accommodated in one housing are a system.

Further, the embodiments of the present disclosure are not limited to the above-described embodiments, and can be modified in various ways without departing from the scope of the present disclosure.

For example, the present disclosure can adopt a configuration of cloud computing in which one function is divisionally and cooperatively processed by a plurality of devices through a network.

In addition, the steps described in the above-described flow charts can be divisionally carried out by a plurality of devices as well as being carried out by one device.

Further, when one step includes a plurality of processes, the plurality of processes included in one step can be divisionally carried out by a plurality of devices as well as being carried out by one device.

In addition, for example, the present disclosure can adopt the following configuration.

(1) An information processing device including: a display control unit that controls a display of an input screen capable of inputting evaluations of an item based on a plurality of viewpoints, in accordance with a plurality of axes representing different viewpoints; an evaluation acquisition unit that acquires the evaluations of the item which are input by a user by the use of the input screen; and a transmission control unit that controls transmission of the evaluations of the item to another information processing device.

(2) The information processing device according to (1), wherein the input screen includes an input region or an input space which is defined by two or more axes and is capable of inputting evaluations based on two or more viewpoints at a time.

(3) The information processing device according to (2), wherein the input region or the input space is capable of inputting an evaluation value according to a set of coordinates within the input region or the input space.

(4) The information processing device according to (2) or (3), wherein the display control unit controls a display switching between a plurality of the input regions or the input spaces through a combination of the different axes.

(5) The information processing device according to any one of (2) to (4), wherein the display control unit controls at least one of the evaluations that are input by the user with respect to an item that is different from an item, to be evaluated to be displayed on the input region or the input space.

(6) The information processing device according to any one of (1) to (5), wherein one of the plurality of viewpoints relates to like or dislike of an item.

(7) The information processing device according to any one of (1) to (6), wherein the display control unit controls the input screen to be automatically displayed when the number of evaluations of the item of the user is less than a predetermined threshold value, and controls the input screen to be displayed by a user's operation when the number of evaluations of the item of the user is equal to or greater than the threshold value.

(8) The information processing device according to any one of (1) to (7), wherein the transmission control unit controls transmission of a command to reset an evaluation history of the user, to the another information processing device by a user's operation.

(9) An information processing method including: causing an information processing device to control a display of an input screen capable of inputting evaluations of an item based on a plurality of viewpoints, in accordance with a plurality of axes representing different viewpoints; causing the information processing device to acquire the evaluations of the item which are input by a user by the use of the input screen; and causing the information processing device to control transmission of the evaluations of the item to another information processing device.

(10) An information processing device including: a display control unit that controls a display of an input screen capable of inputting evaluations of an item based on a plurality of viewpoints, in accordance with a plurality of axes representing different viewpoints, in another information processing device; and a reception control unit that controls reception of the evaluations of the item which are input by a user by the use of the input screen, from the another information processing device.

(11) The information processing device according to (10), wherein the input screen includes an input region or an input space which is defined by two or more axes and is capable of inputting evaluations based on two or more viewpoints at a time.

(12) The information processing device according to (11), wherein the display control unit controls a display switching between a plurality of the input regions or the input spaces through a combination of the different axes.

(13) The information processing device according to (11) or (12), wherein the display control unit controls at least one of the evaluations that are input by the user with respect to an item that is different from an item, to be evaluated to be displayed on the input region or the input space.

(14) The information processing device according to any one of (10) to (13), wherein one of the plurality of viewpoints relates to like or dislike of an item.

(15) The information processing device according to any one of (10) to (14), wherein the display control unit controls the input screen to be automatically displayed when the number of evaluations of the item of the user is less than a predetermined threshold value, and controls the input screen to be displayed by a user's operation when the number of evaluations of the item of the user is equal to or greater than the threshold value.

(16) The information processing device according to any one of (10) to (15), further including a learning unit that learns a preference of the user with respect to the item, on the basis of an evaluation history of the item of the user; and a recommendation unit that recommends an item to the user, on the basis of a learning result of the preference of the user.

(17) The information processing device according to (16), wherein the reception control unit controls reception of a command to reset the evaluation history from the another information processing device, and wherein the learning unit resets the evaluation history in response to the reset command.

(18) The information processing device according to (16) or (17), wherein the recommendation unit recommends a learning item to the user when the number of evaluations of the item of the user is less than a predetermined threshold value, and recommends an item to the user on the basis of a learning result of the preference of the user when the number of evaluations of the item of the user is equal to or greater than the threshold value.

(19) The information processing device according to any one of (16) to (18), wherein the display control unit controls a display of a progress rate of the learning of the user's preference in the another information processing device.

(20) An information processing method including: causing an information processing device to control a display of an input screen capable of inputting evaluations of an item based on a plurality of viewpoints, in accordance with a plurality of axes representing different viewpoints, in another information processing device; and causing the information processing device to control reception of the evaluations of the item which are input by a user by the use of the input screen, from the another information processing device.

The present disclosure contains subject matter related to that disclosed in Japanese Priority Patent Application JP 2012-211766 filed in the Japan Patent Office on Sep. 26, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
a display control unit that controls a display of an input screen capable of inputting evaluations of an item based on a plurality of viewpoints defined by two or more axes representing different viewpoints;
an evaluation acquisition unit that acquires the evaluations of the item which are input by a user by the use of the input screen; and
a transmission control unit that controls transmission of the evaluations of the item to another information processing device,
wherein the input screen includes an input region or an input space which is defined by the two or more axes and is capable of inputting evaluations based on two or more viewpoints at a time.

2. The information processing device according to claim 1, wherein the input region or the input space is capable of inputting an evaluation value according to a set of coordinates within the input region or the input space.

3. The information processing device according to claim 1, wherein the display control unit controls a display switching between a plurality of the input regions or the input spaces through a combination of the different axes.

4. The information processing device according to claim 1, wherein the display control unit controls at least one of the evaluations that are input by the user with respect to an item that is different from an item, to be evaluated to be displayed on the input region or the input space.

5. The information processing device according to claim 1, wherein one of the plurality of viewpoints relates to like or dislike of an item.

6. The information processing device according to claim 1, wherein the display control unit controls the input screen to be automatically displayed when the number of evaluations of the item of the user is less than a predetermined threshold value, and controls the input screen to be displayed by a user's operation when the number of evaluations of the item of the user is equal to or greater than the threshold value.

7. The information processing device according to claim 1, wherein the transmission control unit controls transmission of a command to reset an evaluation history of the user, to the another information processing device by a user's operation.

8. The information processing device according to claim 1, wherein the axes are evaluation axes that each defines a respective scale of evaluation criterion of a corresponding viewpoint.

9. An information processing method comprising:
  causing an information processing device to control a display of an input screen capable of inputting evaluations of an item based on a plurality of viewpoints defined by two or more axes representing different viewpoints;
  causing the information processing device to acquire the evaluations of the item which are input by a user by the use of the input screen; and
  causing the information processing device to control transmission of the evaluations of the item to another information processing device,
  wherein the input screen includes an input region or an input space which is defined by the two or more axes and is capable of inputting evaluations based on two or more viewpoints at a time.

10. An information processing device comprising:
  a display control unit that controls a display of an input screen capable of inputting evaluations of an item based on a plurality of viewpoints defined by two or more axes representing different viewpoints, in another information processing device; and
  a reception control unit that controls reception of the evaluations of the item which are input by a user by the use of the input screen, from the another information processing device,
  wherein the input screen includes an input region or an input space which is defined by the two or more axes and is capable of inputting evaluations based on two or more viewpoints at a time.

11. The information processing device according to claim 10, wherein the display control unit controls a display switching between a plurality of the input regions or the input spaces through a combination of the different axes.

12. The information processing device according to claim 10, wherein the display control unit controls at least one of the evaluations that are input by the user with respect to an item that is different from an item, to be evaluated to be displayed on the input region or the input space.

13. The information processing device according to claim 10, wherein one of the plurality of viewpoints relates to like or dislike of an item.

14. The information processing device according to claim 10, wherein the display control unit controls the input screen to be automatically displayed when the number of evaluations of the item of the user is less than a predetermined threshold value, and controls the input screen to be displayed by a user's operation when the number of evaluations of the item of the user is equal to or greater than the threshold value.

15. The information processing device according to claim 10, further comprising:
  a learning unit that learns a preference of the user with respect to the item, on the basis of an evaluation history of the item of the user; and
  a recommendation unit that recommends an item to the user, on the basis of a learning result of the preference of the user.

16. The information processing device according to claim 15, wherein the reception control unit controls reception of a command to reset the evaluation history from the another information processing device, and
  wherein the learning unit resets the evaluation history in response to the reset command.

17. The information processing device according to claim 15, wherein the recommendation unit recommends a learning item to the user when the number of evaluations of the item of the user is less than a predetermined threshold value, and recommends an item to the user on the basis of a learning result of the preference of the user when the number of evaluations of the item of the user is equal to or greater than the threshold value.

18. The information processing device according to claim 15, wherein the display control unit controls a display of a progress rate of the learning of the user's preference in the another information processing device.

19. An information processing method comprising:
  causing an information processing device to control a display of an input screen capable of inputting evaluations of an item based on a plurality of viewpoints defined by two or more axes representing different viewpoints, in another information processing device; and
  causing the information processing device to control reception of the evaluations of the item which are input by a user by the use of the input screen, from the another information processing device,
  wherein the input screen includes an input region or an input space which is defined by the two or more axes and is capable of inputting evaluations based on two or more viewpoints at a time.

* * * * *